(12) United States Patent
Zimpfer et al.

(10) Patent No.: US 8,571,747 B2
(45) Date of Patent: Oct. 29, 2013

(54) SYSTEM AND METHOD FOR MANAGING AIRCRAFT MAINTENANCE

(75) Inventors: Andrew N. Zimpfer, Renton, WA (US); Duke McMillin, Vashon, WA (US); Jeffrey M. Bearce, Covington, WA (US)

(73) Assignee: The Boeing Company, Chicago, IL (US)

( * ) Notice: Subject to any disclaimer, the term of this patent is extended or adjusted under 35 U.S.C. 154(b) by 1258 days.

(21) Appl. No.: 11/951,700

(22) Filed: Dec. 6, 2007

(65) Prior Publication Data

US 2009/0150022 A1 Jun. 11, 2009

(51) Int. Cl.
G06F 11/30 (2006.01)
G06F 17/00 (2006.01)
G07C 5/00 (2006.01)

(52) U.S. Cl.
USPC ....... 701/29.1; 701/29.4; 701/33.2; 705/7.11; 705/7.13; 705/305

(58) Field of Classification Search
USPC ......... 701/3, 29.1, 29.4, 33.2; 705/7.11, 7.13, 705/305; 715/700, 740, 751; 700/90, 100
See application file for complete search history.

(56) References Cited

U.S. PATENT DOCUMENTS

| | | | |
|---|---|---|---|
| 6,003,808 A * | 12/1999 | Nguyen et al. | 244/1 R |
| 6,125,312 A | 9/2000 | Nguyen et al. | |
| 6,148,179 A * | 11/2000 | Wright et al. | 455/66.1 |
| 6,529,620 B2 | 3/2003 | Thompson | |
| 6,567,729 B2 | 5/2003 | Betters et al. | |
| 6,725,137 B2 | 4/2004 | Eagleton et al. | |
| 6,728,610 B1 | 4/2004 | Marshall et al. | |
| 6,738,748 B2 | 5/2004 | Wetzer | |
| 6,772,098 B1 | 8/2004 | Stark et al. | |
| 6,816,762 B2 | 11/2004 | Hensey et al. | |
| 6,847,872 B2 | 1/2005 | Bodin et al. | |
| 6,885,921 B1 | 4/2005 | Farmer | |
| 6,901,318 B1 | 5/2005 | Morronigiello et al. | |
| 6,952,828 B2 | 10/2005 | Greene | |
| 6,965,816 B2 | 11/2005 | Walker | |
| 7,006,903 B2 | 2/2006 | Smith et al. | |
| 7,031,941 B2 | 4/2006 | Garrow et al. | |
| 7,053,767 B2 | 5/2006 | Petite et al. | |
| 7,068,301 B2 | 6/2006 | Thompson | |
| 7,069,121 B1 | 6/2006 | Cummings, Jr. et al. | |
| 7,069,261 B2 | 6/2006 | Ahl et al. | |
| 7,908,052 B2 * | 3/2011 | Howlett et al. | 701/32.8 |
| 2003/0233178 A1 * | 12/2003 | Sinex | 701/29 |
| 2004/0162811 A1 * | 8/2004 | Wetzer et al. | 707/2 |

* cited by examiner

*Primary Examiner* — Thomas Tarcza
*Assistant Examiner* — Adam Tissot
(74) *Attorney, Agent, or Firm* — Harness, Dickey & Pierce, P.L.C.

(57) ABSTRACT

In one embodiment, a method of managing maintenance of an aircraft is provided. In one implementation the method includes generating an electronic report that indicates a fault of the aircraft; electronically integrating the electronic report with resource data and flight schedule data to establish a repair solution for the fault; and generating an electronic work order based on the repair solution.

19 Claims, 23 Drawing Sheets

SYSTEM AND METHOD FOR MANAGING AIRCRAFT MAINTENANCE

The present disclosure relates to methods and systems of an aircraft maintenance process.

BACKGROUND

The statements in this section merely provide background information related to the present disclosure and may not constitute prior art.

Existing aircraft maintenance processes require manual coordination of various systems and personnel. The systems and personnel typically exist across multiple organizations. Each organization must coordinate with the other organizations to schedule and perform the maintenance in time to accommodate a flight schedule. Managing multiple organizations provides complexity to the aircraft maintenance process.

In some cases, the systems of the maintenance processes are software driven systems. The software systems typically provide additional or fewer features than necessary, thus adding to the complexity of the maintenance process. In some cases, one or more steps of the existing maintenance process rely on paper based information. Paper based systems are commonly burdensome, slow, and prone to error.

SUMMARY

In one embodiment, a method of managing maintenance of an aircraft is provided. In one implementation the method includes generating an electronic report that indicates a fault of the aircraft; electronically integrating the electronic report with resource data and flight schedule data to establish a repair solution for the fault; and generating an electronic work order based on the repair solution.

In another embodiment, a maintenance management system for an aircraft is provided. In one implementation, the maintenance management system includes one or more computer readable mediums. The computer readable mediums bear a fault evaluator, a work order generator, a maintenance manager, and a work manager. The fault evaluator is operable to evaluate fault data of an aircraft and establish a repair solution. The work order generator is operable to generate a work order based on the repair solution. The maintenance manager is operable to assign the work order to a technician. The work manager is operable to manage work associated with the work order as it is being performed by the technician.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
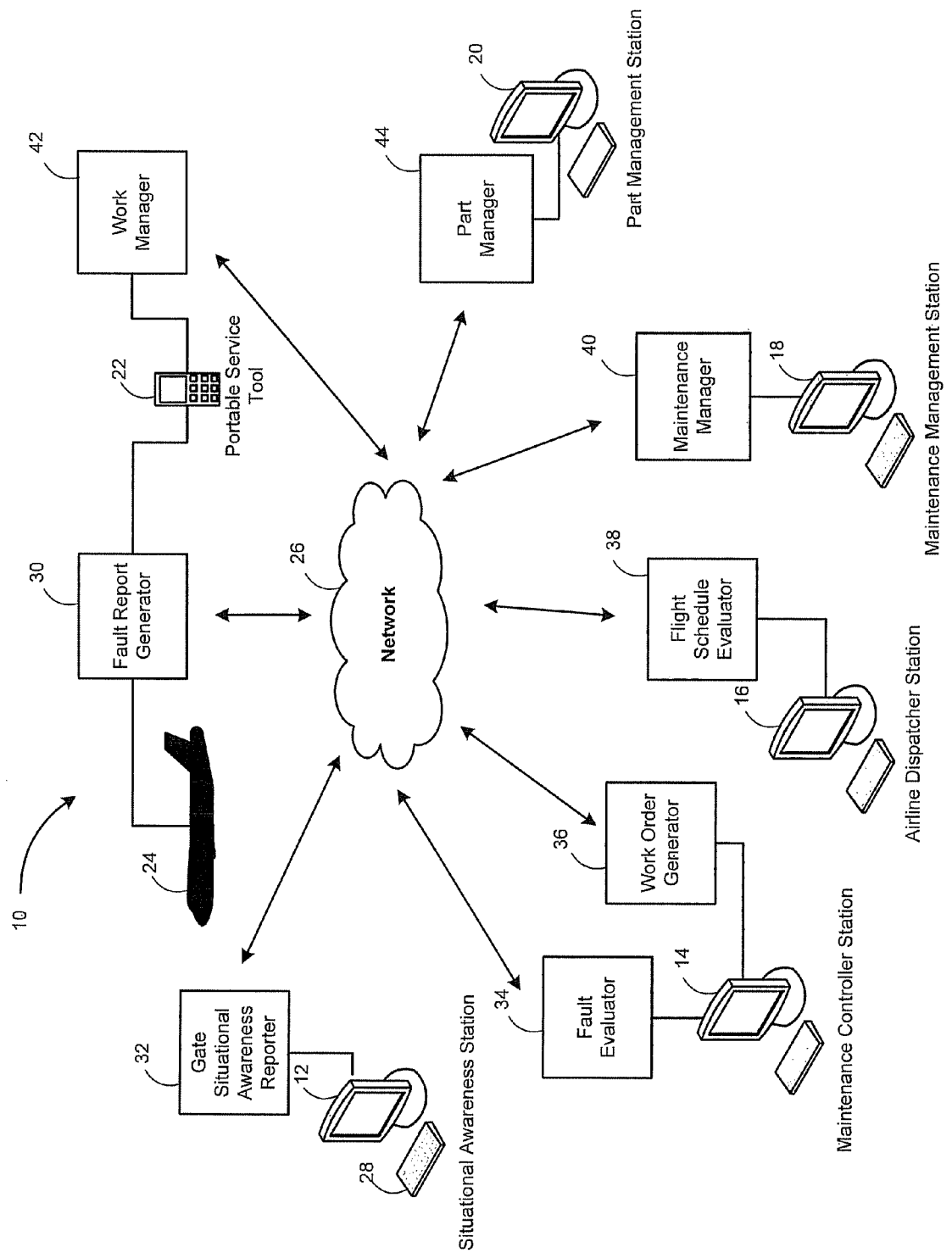
FIG. 1 is a system diagram illustrating an aircraft maintenance management system according to various aspects of the present disclosure.

The following description is merely exemplary in nature and is not intended to limit the present disclosure, application, or uses. It should be understood that throughout the drawings, corresponding reference numerals indicate like or corresponding parts and features.

Referring now to FIG. 1, an aircraft maintenance management system is shown generally at 10. The aircraft maintenance management system 10 is shown to include one or more work stations 12-20 and/or portable service tools 22 that communicate with one another and an aircraft 24 via a network 26. The portable service tool 22 can be, for example, a laptop, a customized technician tool, and/or a RFID reader.

The one or more work stations 12-20 can include, but are not limited to, a situational awareness station 12, a maintenance controller station 14, an airline dispatcher station 16, a maintenance management station 18, and a part management station 20. Each work station 12-20 can be associated with one or more input devices 28 used by a user to communicate with the work station 12-20. As can be appreciated, such input devices 28 may include, but are not limited to, a mouse, a keyboard, a touchpad, and a code identification reader.

The work stations 12-20, portable service tool 22, and the aircraft 24 each include a processor and one or more data storage devices. The one or more data storage devices can be at least one of random access memory (RAM), read only memory (ROM), a cache, a stack, or the like which may temporarily or permanently store electronic data. The processor is operable to execute one or more sets of instructions contained in the maintenance management software described herein. It can be appreciated that the maintenance management software can be implemented as any number of individual software applications that are individually installed to and performed by an assigned electronic device. Alternatively, the aircraft maintenance management software can be implemented as a single software application that is installed to each electronic device or run from a remote location such as a from a remote server (not shown). For ease of the discussion, the remainder of the disclosure will be discussed in the context of the example shown in FIG. 1.

As shown in FIG. 1, the maintenance process software is partitioned into individual applications. The applications include a fault report generator 30, a gate situational awareness reporter 32, a fault evaluator 34, a work order generator 36, a flight schedule evaluator 38, a maintenance manager 40, a work manager 42, and a part manager 44. As can be appreciated, the applications may be combined and/or further partitioned to similarly manage the maintenance of the aircraft 24.

As shown, the applications are separately installed to and run by work stations 12-20, the aircraft 24, and the portable service tool 22. For example, the fault report generator 30 is installed to the aircraft 24 and/or the portable service tool 22. The fault report generator 30 generates reports indicating a fault of the aircraft 24. The reports are sent to a ground station via the network 26. The fault evaluator 34 and the work order generator 36 are installed to the maintenance controller station 14. The fault evaluator 34 can evaluate the fault reports and establish a repair solution. Based on the repair solution, the work order generator can generate a maintenance work order and reserve parts.

The flight schedule evaluator 38 is installed to the airline dispatcher station 16. The flight schedule evaluator 38 can evaluate the current flight schedule and determine whether the maintenance can be performed. If, given the current flight schedule the maintenance cannot be performed, the flight schedule evaluator 38 can adjust the flight schedule and provide an alternative tail swap. Based on the flight schedule and the tail swap, the work order generator 36 can adjust a maintenance schedule.

The maintenance manager 40 is installed to the maintenance management station 18. The maintenance manager 40 assigns the work orders and retrieves the parts based on the work orders generated by the work order generator 36. The part manager 44 is installed to the part management station 20. The part manager 44 manages the reserved parts. The work manager 42 is installed to the portable service tool 22. The work manager 42 manages the work as well as the part information as the maintenance is being performed by a technician. In various embodiments, the work manager can generate additional fault reports based on a visual inspection of the aircraft while performing the maintenance. The gate situational awareness reporter 32 is installed to the situational awareness station 12. The gate situational awareness reporter 32 provides updated gate information that indicates available time to the technician as he is performing the maintenance.

Figure 2:
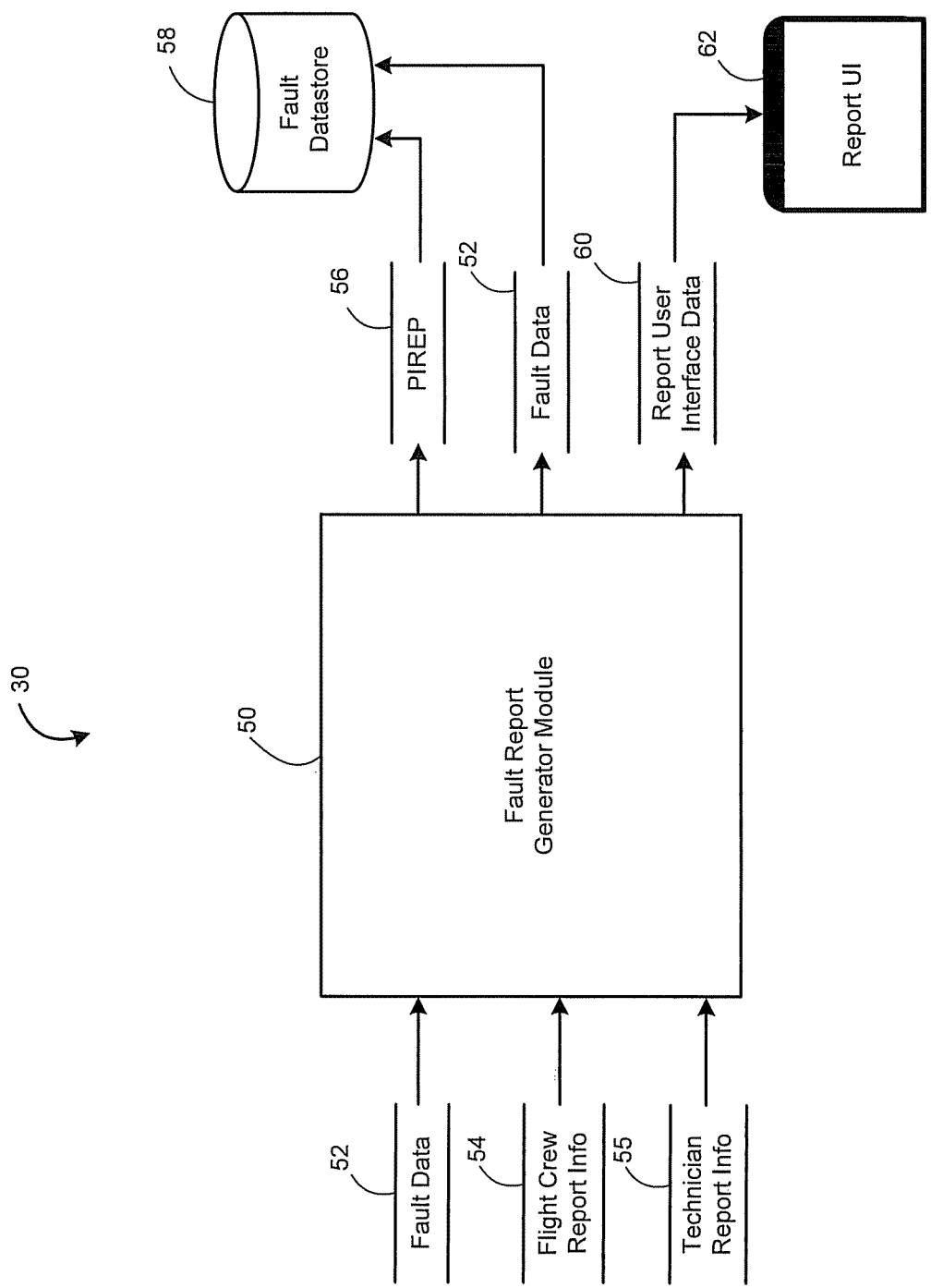
FIG. 2 is a functional block diagram illustrating a fault report generator of the aircraft maintenance management system of FIG. 1, according to various aspects of the present disclosure.

With reference to FIG. 2, the fault report generator 30 is shown in more detail. The fault report generator 30 is shown to include a fault report generator module 50 that is associated with one or more datastores. The fault report generator module 50 receives as input fault data 52 generated by the aircraft 24 (FIG. 1), report information 54 entered by flight crew members such as, a pilot, a co-pilot, or a flight attendant, and/or report information 55 provided by a technician while performing a repair. In various embodiments, the flight crew report information 54 is entered by one or more of the flight crew members after performing an inspection of the aircraft 24 (FIG. 1) either during the flight or after the aircraft 24 (FIG. 1) has landed.

The flight crew report information 54 can be entered by the crew members or the technician via a report user interface (UI) 62. The fault report generator module 50 managers the repot UI 62 via report user interface data 60. Based on the inputs 52, 54, and/or 55 the fault report generator module 50 generates a pilot or technician report, hereinafter referred to as a pilot report (PIREP) 56, and/or fault data 52 and stores the PIREP 56 and fault data 52 in a fault datastore 58. As can be appreciated, the datastores can be located within or remotely from the modules.

Figure 3:
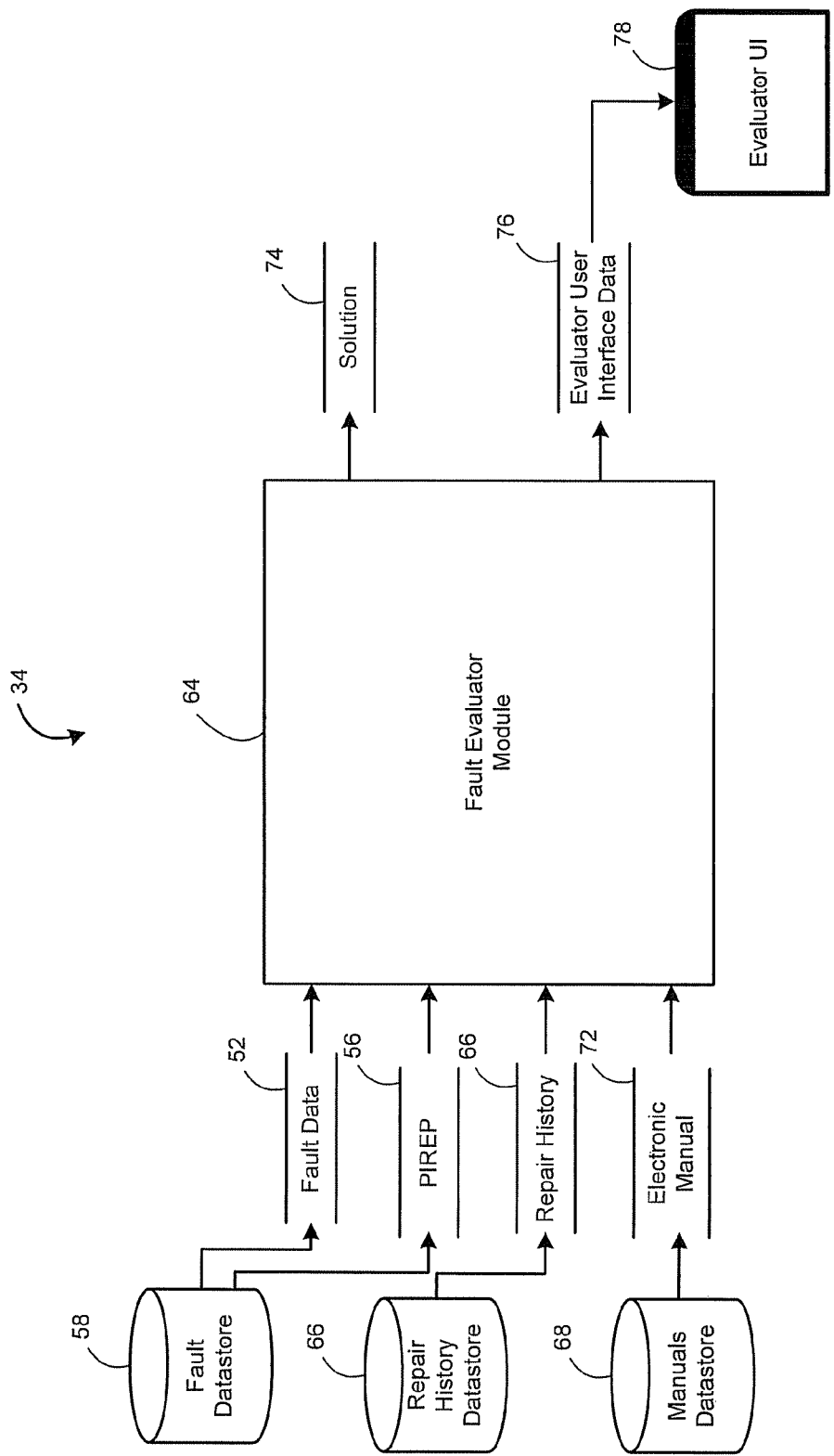
FIG. 3 is a functional block diagram illustrating a fault evaluator of the aircraft maintenance management system of FIG. 1, according to various aspects of the present disclosure.

With reference to FIG. 3, the fault evaluator 34 is shown in more detail. The fault evaluator 34 is shown to include a fault evaluator module 64 that is associated with one or more datastores 58, 66, 68. The fault evaluator module 64 receives as input the fault data 52 and/or the PIREP 56 stored in the fault datastore 58. Based on the PIREP 56 and the fault data 52, the fault evaluator module 64 presents the faults, and establishes a solution 74 for repair. To assist with establishing the solution 74, the fault evaluator module 64 receives as input a repair history 70 stored in a repair history datastore 66, and any relevant electronic manuals 72 stored in a manuals datastore 68.

In various embodiments, a maintenance controller interacts with the fault evaluator module 64 via an evaluator UI 78 to establish the solution 74. The fault evaluator module 64 manages the evaluator UI 78 via evaluator user interface data 76. In various other embodiments, the fault evaluator module 64 is an automated system that selects the solution 74 based on predefined rule sets and the repair history 70.

Figure 4:
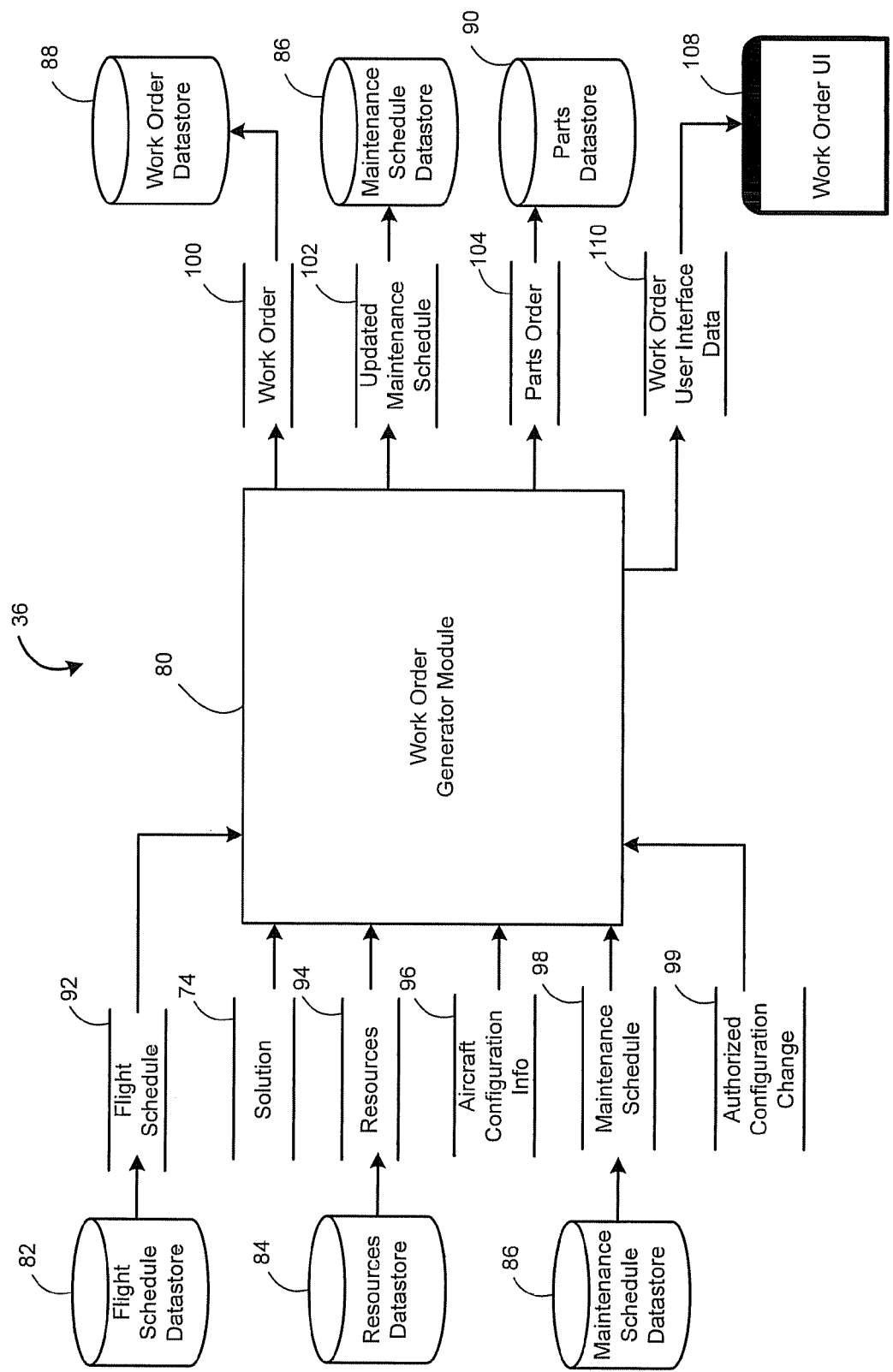
FIG. 4 is a functional block diagram illustrating a work order generator of the aircraft maintenance management system of FIG. 1, according to various aspects of the present disclosure.

With reference to FIG. 4, the work order generator 36 is shown in more detail. The work order generator 36 is shown to include a work order generator module 80 that is associated with one or more datastores 82-90. The work order generator module 80 receives as input the solution 74, a current flight schedule 92 stored in a flight schedule datastore 82, available resources 94 stored in a resources datastore 84, aircraft configuration information 96, a current maintenance schedule 98 stored in a maintenance schedule datastore 86, and an authorized configuration change request 99. The available resources 94 can include, for example, available parts, available technicians, available tools, and/or location line station capabilities. The aircraft configuration information 96 indicates the type of the aircraft 24 (FIG. 1) and the as-flying configuration that indicates current revision levels of the parts on the aircraft 24 (FIG. 1). The authorized configuration change request 99 includes, for example, a part change request indicating that a new revision level is available for installation on the aircraft 24 (FIG. 1). The authorized configuration change request 99 can be generated by a regulatory body and/or a parts manufacturer.

The work order generator module 80 generates a work order 100 based on the solution 74 or the authorized configuration change request 99 and stores the work order 100 in a work order datastore 88. The work order generator module 80 generates a parts order 104 based on the solution 74 or the authorized configuration change request 99 and the aircraft configuration information 96 and stores the parts order 104 in a parts datastore 90. The work order generator module 80 schedules the work order 100, provides an updated maintenance schedule 102, and stores the updated maintenance schedule 102 back in the maintenance schedule datastore 86.

In various embodiments, a maintenance controller interacts with the work order generator module 80 via a work order UI 108 to generate the work order 100 and the parts order 104. The work order generator module 80 manages the work order UI 108 via work order user interface data 110. In various other embodiments, the work order generator module 80 is an automated system that automatically generates the work order 100 and the parts order 104 based on predefined rule sets, the solution 74, the current flight schedule 92, the available resources 94, the aircraft configuration information 96, the current maintenance schedule 98, and/or the authorized configuration change request 99.

Figure 5:
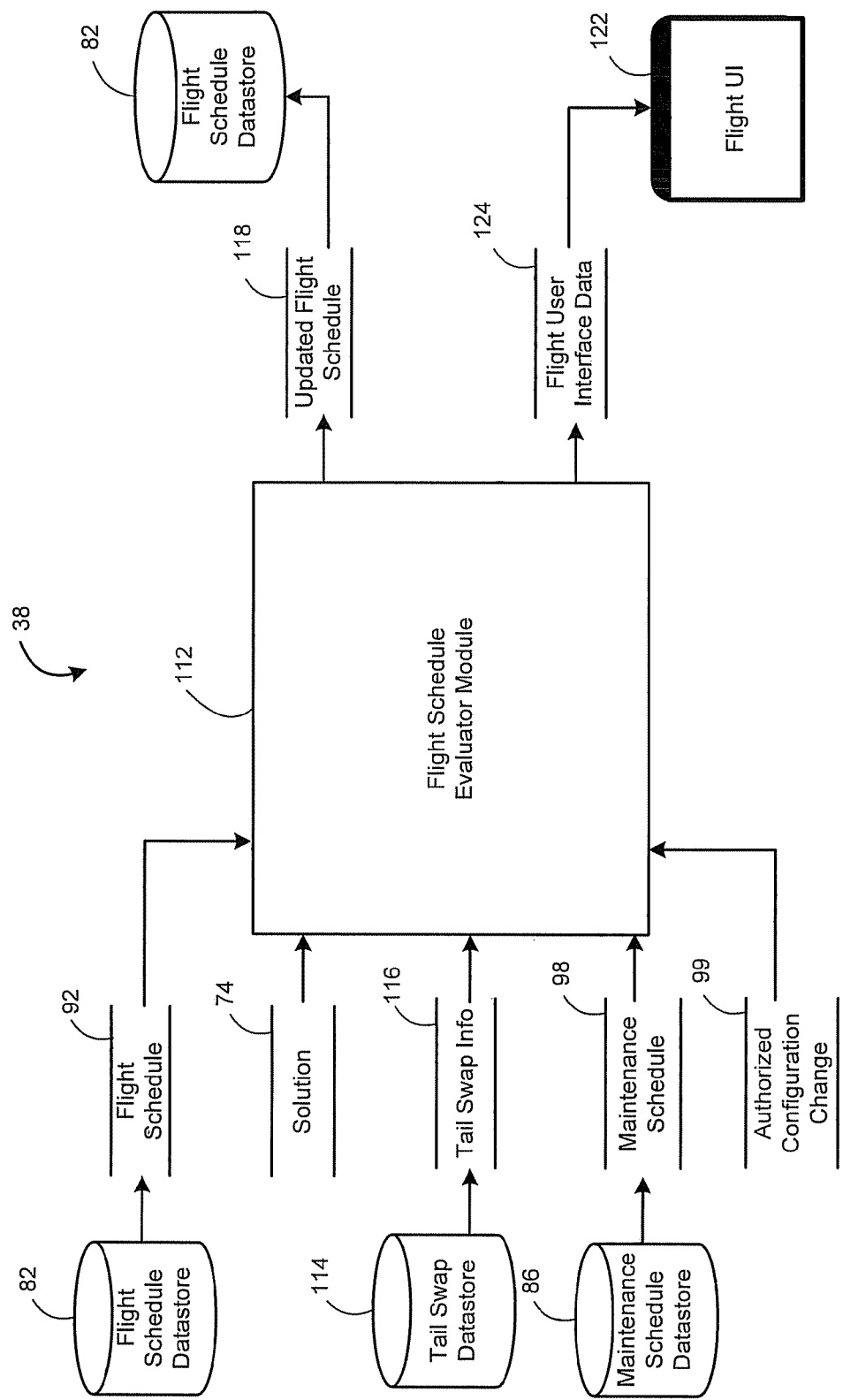
FIG. 5 is a functional block diagram illustrating a flight schedule evaluator of the aircraft maintenance management system of FIG. 1, according to various aspects of the present disclosure.

With reference to FIG. 5, the flight schedule evaluator 38 is shown in more detail. The flight schedule evaluator 38 is shown to include a flight schedule evaluator module 112 that is associated with one or more datastores 82, 86, 114. The flight schedule evaluator module 112 receives as input the current flight schedule 92 from the flight schedule datastore 82, the solution 74, tail swap information 116 stored in a tail swap datastore 114, the current maintenance schedule 98 stored in the maintenance schedule datastore 86, and/or the authorized configuration change request. The tail swap information 116 can include information about alternative aircrafts that are available to perform upcoming flights.

The flight schedule evaluator module 112 evaluates whether the solution 74 or the authorized configuration change request 99 can be performed based on the current flight schedule 92 and the current maintenance schedule 98. If the solution 74 or the authorized configuration change request 99 cannot be performed and the work cannot be deferred, the flight schedule evaluator module 112 removes the faulty aircraft 24 (FIG. 1) from the current flight schedule 92 and schedules a non-faulty aircraft in place of the faulty aircraft 24 (FIG. 1) based on the tail swap information 116. The flight schedule evaluator module 112 stores an updated flight schedule 118 in the flight schedule datastore 82.

In various embodiments, a flight coordinator and/or an airline dispatcher interacts with the flight schedule evaluator module 112 via a flight UI 122. The flight schedule evaluator module 112 manages the flight UI 122 via flight user interface data 124. In various other embodiments, the flight schedule evaluator module 112 is an automated system that automatically updates the flight schedule based on predefined rule sets, the current flight schedule 92, the tail swap information 116, and the current maintenance schedule 98.

Figure 6:
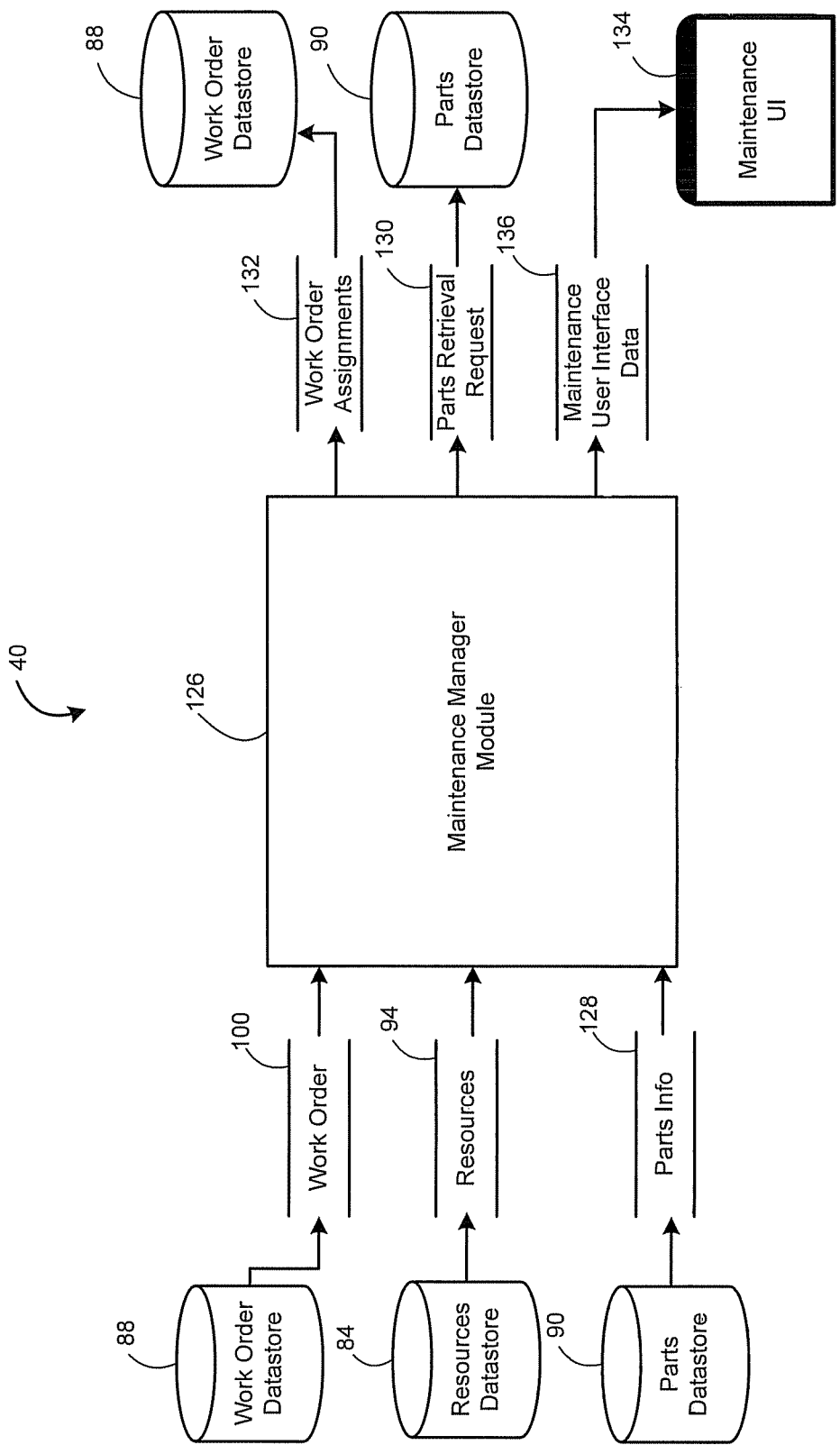
FIG. 6 is a functional block diagram illustrating a maintenance manager of the aircraft maintenance management system of FIG. 1, according to various aspects of the present disclosure.

With reference to FIG. 6, the maintenance manager 40 is shown in more detail. The maintenance manager 40 is shown to include a maintenance manager module 126 that is associated with one or more datastores 84, 88, 90. The maintenance manager module 126 receives as input the work order 100 stored in the work order datastore 88, the resources 94 stored in the resources datastore 84, and parts information 128 stored in the parts datastore 90. The resources 94 can include, for example, the current site resources such as, tools, technicians, the technicians' skills and certifications, and the site capabilities. The parts information 128 can include, for example, a part quantity, a part identification number, a part status, a part revision, and a part location.

The maintenance manager module 126 assigns the work orders 100 to available technicians and generates requests to retrieve the parts based on the resources 94 and the parts information 128. The maintenance manager module 126 updates the work order 100 by storing a work order assignment 132 in the work order datastore 88 and updates the parts information 128 by storing the part retrieval request 130 in the parts datastore 90.

In various embodiments, a maintenance supervisor interacts with the maintenance manager module 126 via a maintenance UI 134. The maintenance manager module 126 manages the maintenance UI 134 via maintenance user interface data 136. In various other embodiments, the maintenance manager module 126 is an automated system that automatically generates the work order assignments 132 and the part retrieval requests 130 based on predefined rule sets, the work order 100, the site resources 94, and the parts information 128.

Figure 7:
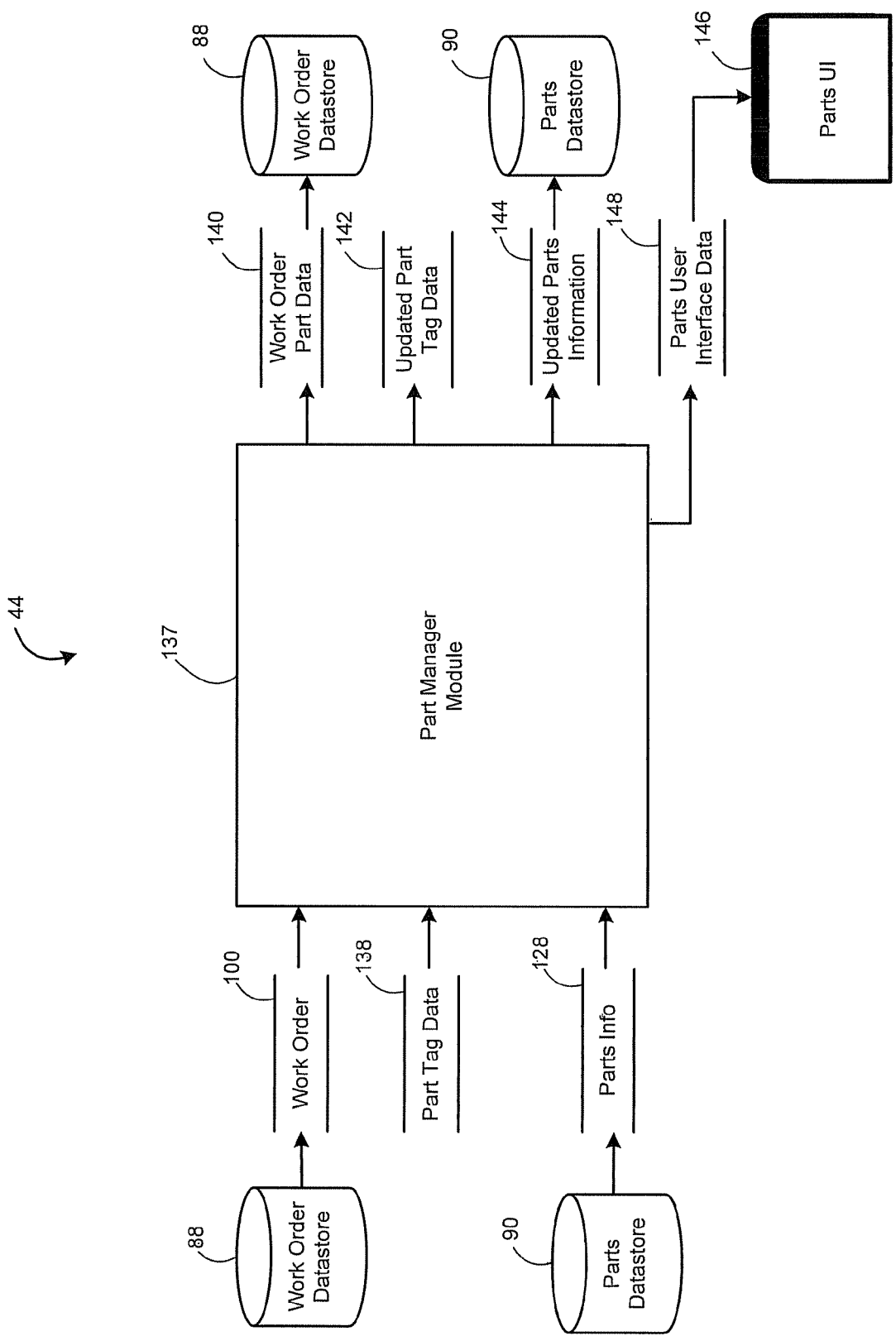
FIG. 7 is a functional block diagram illustrating a part manager of the aircraft maintenance management system of FIG. 1, according to various aspects of the present disclosure.

With reference to FIG. 7, the part manager 44 is shown in more detail. The part manager 44 is shown to include a part manager module 137 that is associated with one or more datastores 88, 90. The part manager module 137 receives as input the work order 100 stored in the work order datastore 88, part tag data 138, and the parts information 128 stored in the parts datastore 90. The parts information 128 can include, for example, a part quantity, a part identification number, a part status, a part revision, and a part location. The part tag data 138 is a subset of the parts information 128 and can include, for example, the part identification number, the part revision, and the part status.

The part manager module 137 manages the retrieval and release of the parts for the assigned work order 100. In various embodiments, the part manager module 137 updates the work order 100 to be associated with the released part and stores work order part data 140 in the work order datastore 88. The part manager module 137 receives the part tag data 138 associated with, for example, a scanned bar code for that particular part. The part manager module 137 updates the status of the part tag data 138 when the part is released. The part manager module 137 updates the parts information and stores the updated parts information 144 back in the parts datastore 90.

In various embodiments, a stores clerk interacts with the part manager module 137 via a part UI 146 to retrieve and release the parts. The part manager module 137 manages the part UI 146 via part user interface data 148. In various other embodiments, the part manager module 137 is an automated system that automatically manages the release of the parts based on predefined rule sets, the work order 100, the part tag data 138, and the parts information 128.

Figure 8:
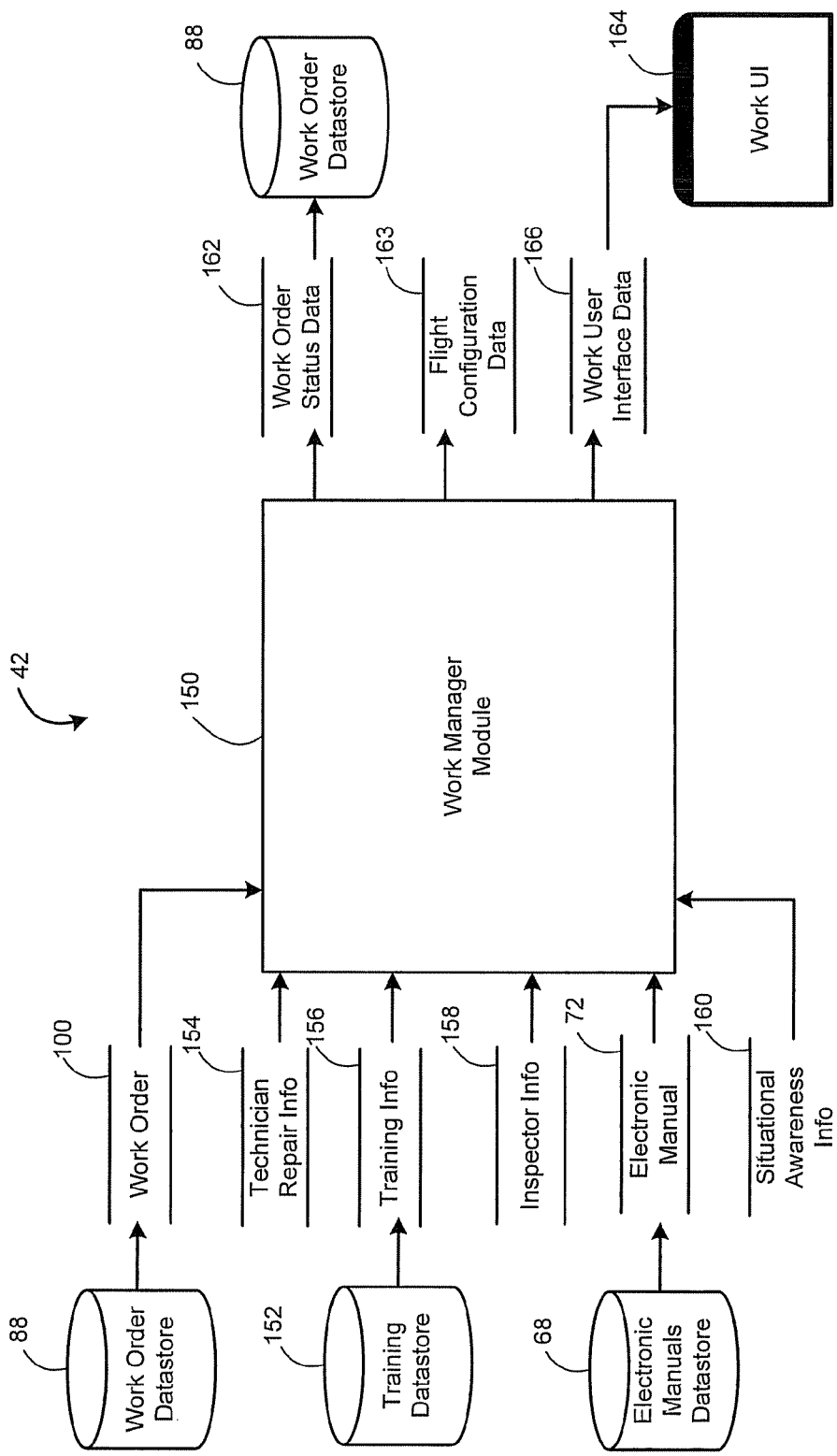
FIG. 8 is a functional block diagram illustrating a work manager of the aircraft maintenance management system of FIG. 1, according to various aspects of the present disclosure.

With reference to FIG. 8, the work manager 42 is shown in more detail. The work manager 42 is shown to include a work manager module 150 that is associated with one or more datastores 68, 88, 152. The work manager module 150 receives as input the work order 100 stored in the work order datastore 88, technician repair information 154, training information 156 stored in a training datastore 152, inspector information 158, the electronic manuals 72 stored in the manuals datastore 68, and situational awareness information 160. The situational awareness information 160, for example, indicates timing information of other events occurring while the aircraft 24 (FIG. 1) is at or near the gate.

The work manager module 150 manages the work as it is being performed by the technician. The technician provides a status of the work via the technician repair information 154. The work manager module 150 can provide training as well as reference manuals to the technician before or during the performance of the work via the training information 156 and the electronic manual 72. The work manager module 150 notifies the technician of the situational awareness information 160 so that the technician can manage his time while performing the work.

After the work has been performed, the work manager module 150 manages the inspection of the work based on the inspector information 158. As the work and inspection are being performed, the work order status data 162 is updated in the work order datastore 88. The technician and/or the inspector can interact with the work manager module 150 via a work UI 164. The work manager module 150 manages the work UI 164 via work user interface data 166.

Figure 9:
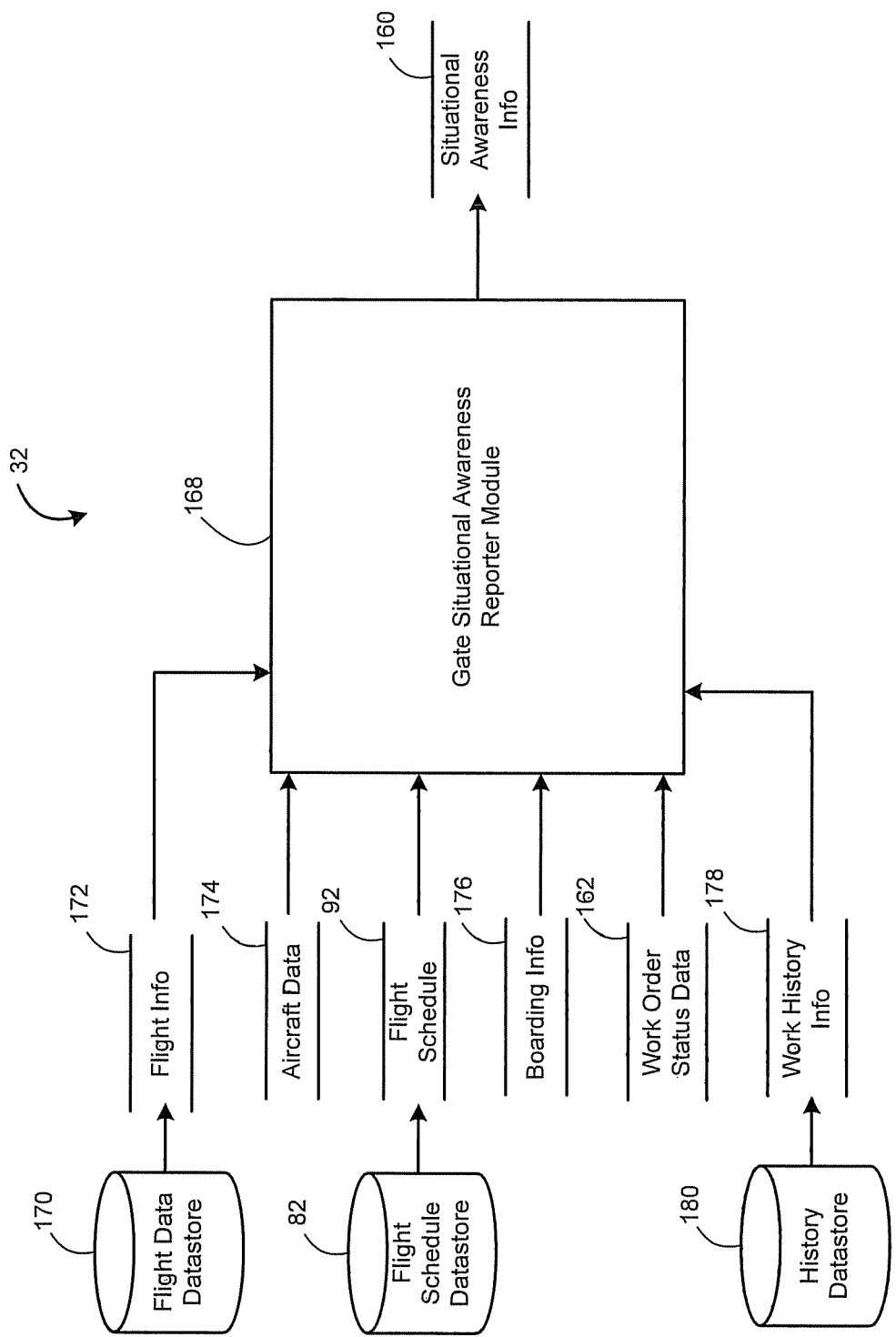
FIG. 9 is a functional block diagram illustrating a gate situational awareness reporter of the aircraft maintenance management system of FIG. 1, according to various aspects of the present disclosure.

With reference to FIG. 9, the gate situational awareness reporter 32 is shown in more detail. The gate situational awareness reporter 32 is shown to include a gate situational awareness reporter module 168. The gate situational awareness reporter module 168 can be associated with one or more datastores 82, 170, 180. The gate situational awareness reporter module 168 receives as input flight information 172 stored in a flight data datastore 170, the flight schedule 92 stored in the flight schedule datastore 82, aircraft data 174, boarding information 176, work order status data 162, and work history information 178 stored in a history datastore 180. The flight information 172 can include, for example, a number of passengers on the flight. The aircraft data 174 can include sensory information generated by the aircraft 24 (FIG. 1), such as, a fuel level status, an exit door status (e.g., open, closed), and a load status (e.g., indicating a current weight of the baggage loaded to the aircraft 24 (FIG. 1)). The boarding information 176 can include information from the gate terminal indicating a number of passengers that have boarded the aircraft 24 (FIG. 1). Work history information 178 can include information indicating past history of the time it takes to perform the ground services and/or the maintenance.

Based on the inputs 92, 102, 172-178, the gate situational awareness reporter module 168 monitors activity of the aircraft 24 (FIG. 1) at the gate and generates situational awareness information 160. The situational awareness information 160 includes a prediction of available time for performing the maintenance on the aircraft 24 (FIG. 1).

Referring now to FIGS. 10a through 16b, FIGS. 10a through 16b are process flow diagrams illustrating an exemplary business method of managing aircraft maintenance using the aircraft maintenance management system 10 (FIG. 1) as discussed above. As shown in FIGS. 10a through 16b, the aircraft maintenance management system 10 (FIG. 1) is used by one or more aircraft maintenance personnel to schedule and perform the maintenance. As previously discussed, the aircraft maintenance process personnel can be, for example, a pilot, a part manufacturer, a regulatory agency, a maintenance controller, an airline dispatcher, a flight coordinator, a maintenance supervisor, a stores clerk, a line technician, an inspector, or a repair router. As can be appreciated, a particular location of the aircraft maintenance process personnel can vary. As can be appreciated, operation of the aircraft maintenance method can be executed in varying order and therefore is not limited strictly to the sequential execution as illustrated in FIGS. 10a through 16b.

Figure 10A:
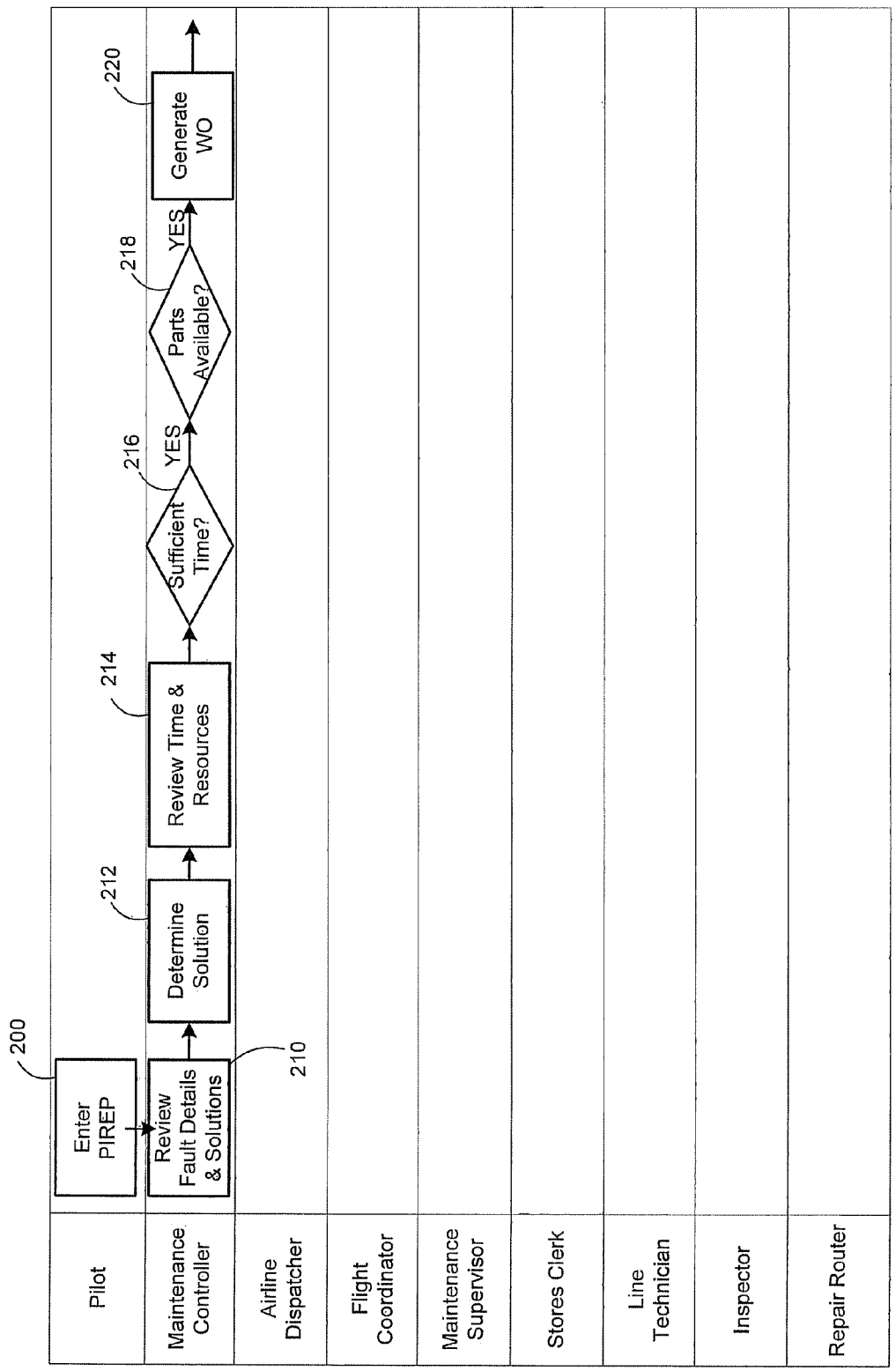
FIGS. 10a and 10b are process flow diagrams illustrating exemplary steps of performing aircraft maintenance management according to a first embodiment and based on the aircraft maintenance management system of FIG. 1, according to various aspects of the present disclosure.
Figure 10B:
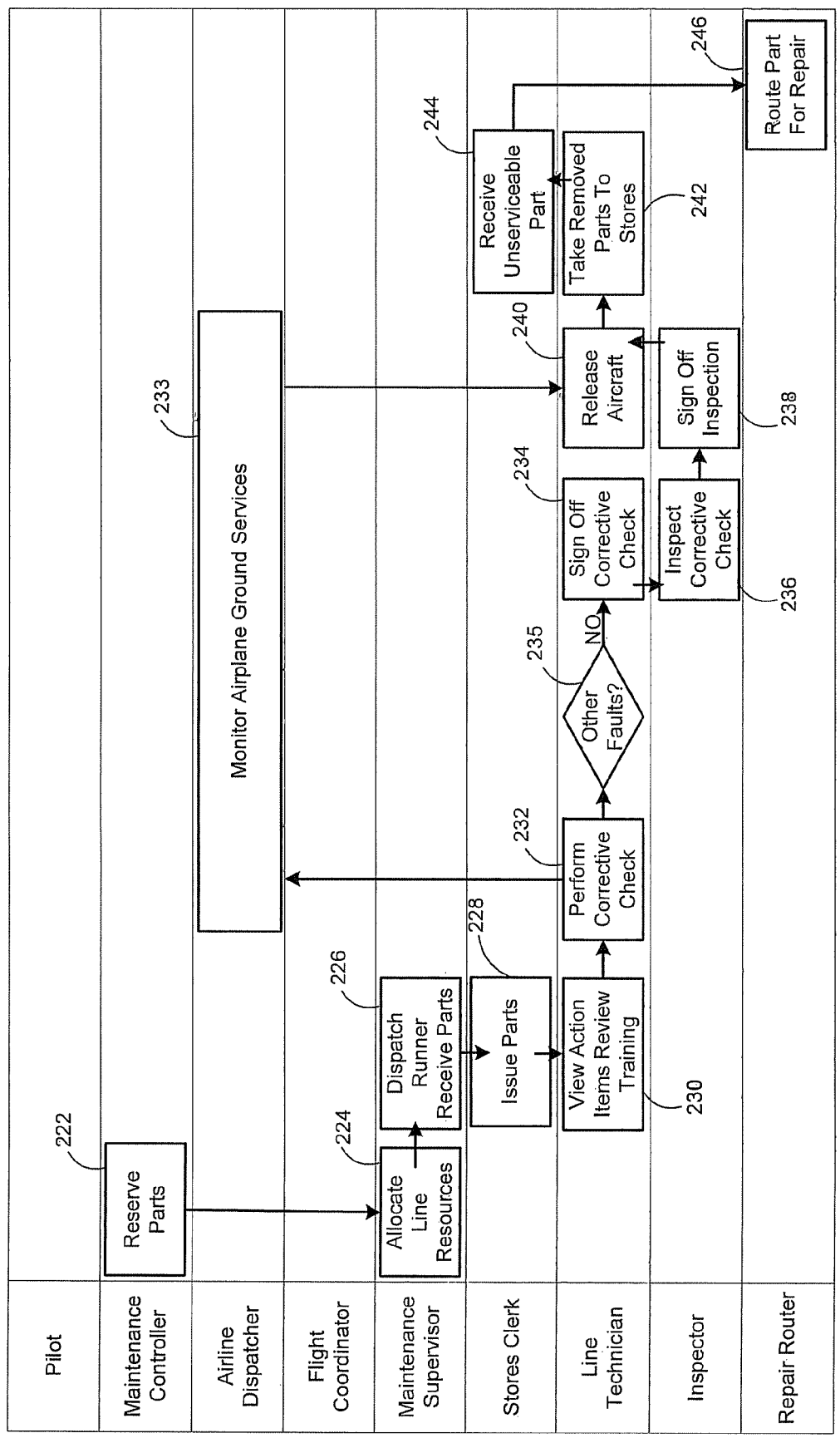
Figure 11A:
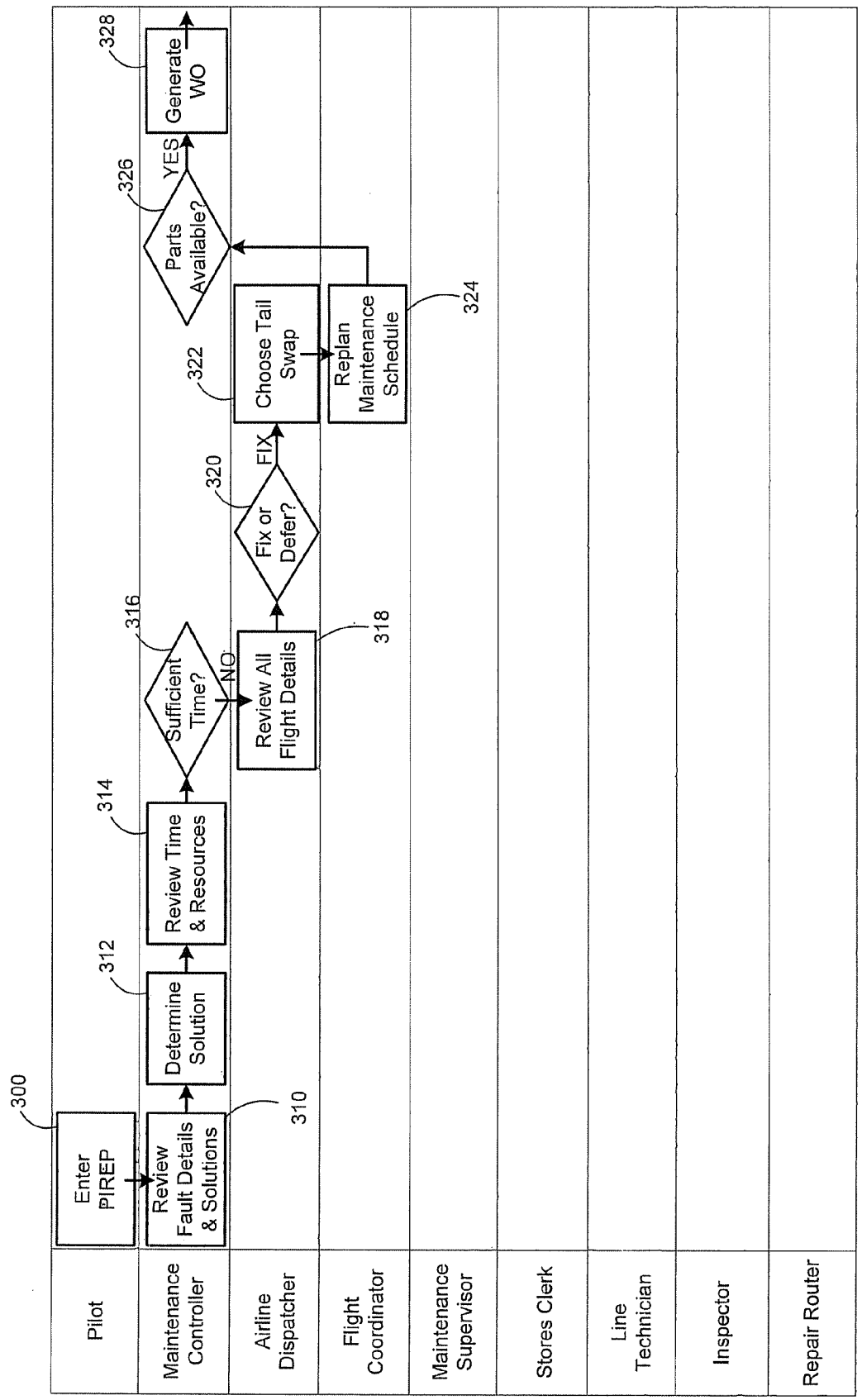
FIGS. 11a and 11b are process flow diagrams illustrating exemplary steps of performing aircraft maintenance management according to a second embodiment and based on the aircraft maintenance management system of FIG. 1, according to various aspects of the present disclosure.
Figure 11B:
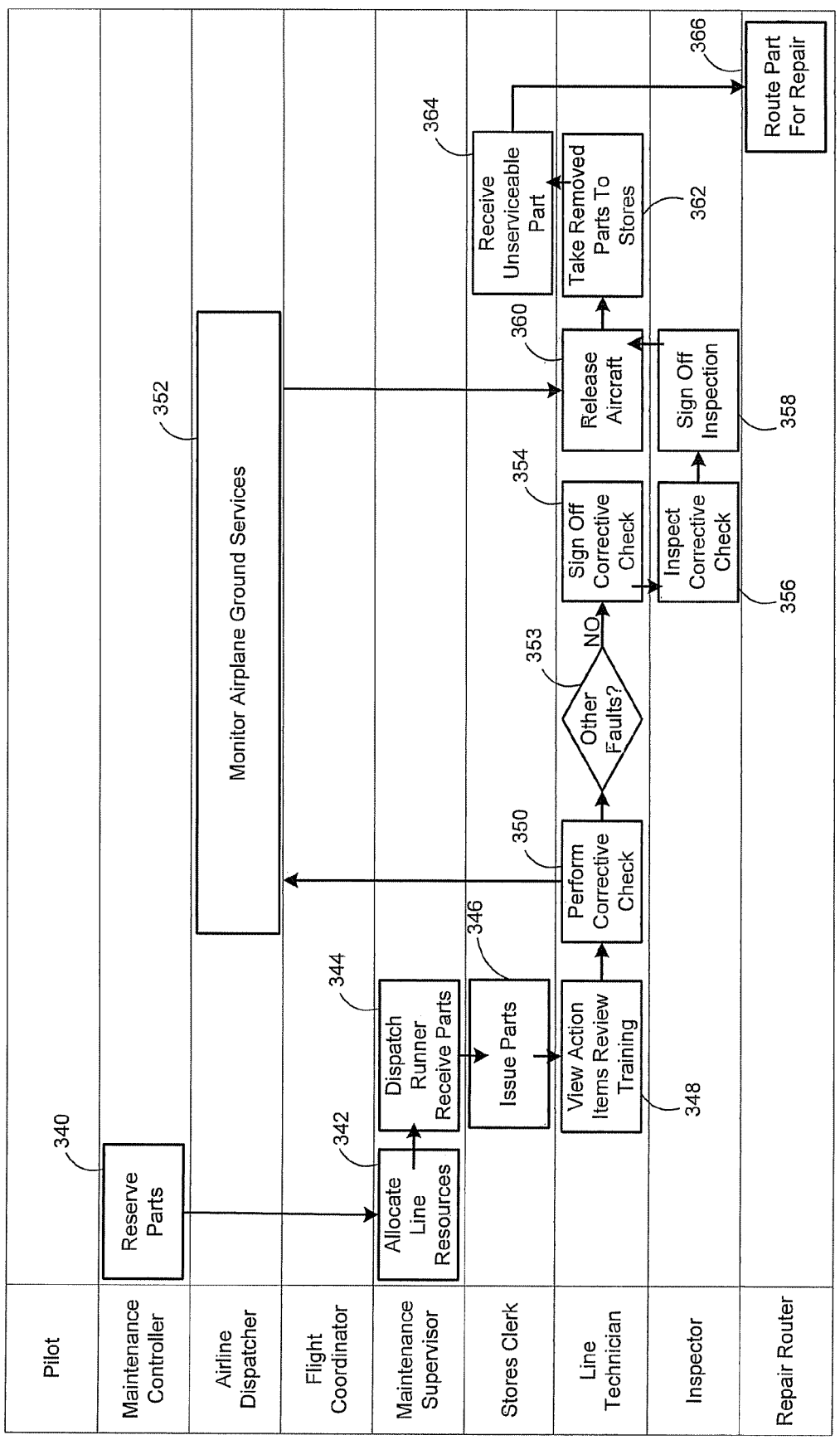

With reference to FIGS. 10a and 10b, at 200, the pilot on the aircraft 24 (FIG. 1) is made aware of a fault in flight by an advisory that may be displayed by an alerting system of the aircraft 24 (FIG. 1). The pilot enters the fault data 52 (FIG. 2) and generates the PIREP 56 (FIG. 2) using the fault report generator 30 (FIG. 2). Upon storing the PRIEP 56 (FIG. 2), the PRIEP 56 (FIG. 2) is transmitted to the ground via the network 26 (FIG. 1).

At 210, the maintenance controller views the PRIEP 56 (FIG. 2), the selected electronic manual 72 (FIG. 3), and the repair history 70 (FIG. 3) using the fault evaluator 34 (FIG. 3). For example, the maintenance controller views the PIREP 56 (FIG. 3) and selects a fault isolation electronic manual 72 (FIG. 3) to review maintenance rules. Next, the maintenance controller looks at the repair history 70 (FIG. 3) to see if the maintenance issue has had previous occurrences within the last ten flights. The maintenance controller looks for possible causes and a past fix effectiveness associated with each cause. Finally, the maintenance controller evaluates whether the fault can be deferred.

At 212, based on the provided information, the maintenance controller selects the solution 74 (FIG. 3) using the fault evaluator 34 (FIG. 34). Once the maintenance controller has the solution 74 (FIG. 3), he can manage and review the resources 94 (FIG. 4) and the current flight schedule 92 (FIG. 4) using the work order generator 36 (FIG. 4). For example, first the maintenance controller reviews the available resources 94 (FIG. 4) such as the technicians, their qualifications, and the available tools. Then the maintenance controller reviews the current flight schedule 92 (FIG. 4). If there is sufficient time to complete the work and the resources are available at the next location, the work order 100 (FIG. 4) is generated at 220 and the parts are reserved at 222 using the work order generator 36 (FIG. 4).

At 216, if, however, there is not enough time to complete the repair given the current flight schedule 92 (FIG. 4), further analysis is required to understand if the aircraft 24 (FIG. 1) can continue its next flight without completing the repair as will be discussed in more detail below. At 218, if, however, the required resources are not available, further analysis is required to understand if the aircraft 24 (FIG. 1) can continue its next flight without completing the repair as will be discussed in more detail below.

At 224, the maintenance supervisor reviews the work orders 100 (FIG. 6) that are scheduled for the day and starts planning the next shift using the maintenance manager 40 (FIG. 6). For example, the maintenance supervisor begins the assignment of labor for the work order tasks, and then views a list of the tools and parts needed and their availability. The maintenance supervisor dispatches a runner to retrieve the parts at 226 such that they are available for the repair.

At 228, a stores clerk checks his list of upcoming work orders 100 (FIG. 7) and reserved parts using the part manager 44 (FIG. 7). The stores clerk then retrieves the parts from his storesroom. The parts are tagged with the part tag data 138 (FIG. 7) that includes a historical record of actions taken, the manufacturing company's ID code, a unique serial number, and part numbers. The stores clerk issues the part and generates the work order part data 140 (FIG. 7) by recording the action as ISSUED and the part condition as NEW and then by associating the parts with the work order, along with the runner's name.

At 230, the line technician, at the beginning of her shift, views her assignment queue using the work manager 42 (FIG. 8). Depending on the difficulty of her scheduled work, she can obtain refresher information for the tasks from the training information 156 (FIG. 8) as well as the electronic manuals 72 (FIG. 8). At 232, at this point, the line technician is ready to perform the repair. She starts by recording start times for her check activities. The information about the airplane's usage status is recorded along with the start time. After getting out the pre-assigned tools, she begins performing the work. After the technician removes the part from the aircraft 24 (FIG. 1), she records the action taken as REMOVED and the part condition as UNSERVICEABLE. She then records the part to be installed and installs the part on the aircraft 24 (FIG. 1). While or after installing the part, the technician performs a visual check of the surrounding components of the aircraft 24 (FIG. 1) to see if other faults exist. If no other faults exist at 235, the process continues.

Meanwhile, at 233, the gate situational awareness reporter 32 (FIG. 9) monitors gate boarding and maintenance activities that occur across a predicted time schedule. The gate situational awareness reporter 32 (FIG. 9) can monitor a terminal view of the aircraft at the gate to determine where the plane is and the schedule status (e.g., late, on-time). To provide a more detailed view, the gate situational awareness reporter 32 (FIG. 9) can view ground services at each gate and the current status of each to make predictive schedule changes as needed.

Once the work has been completed and no other faults exist at 235, the technician records her stop times and signs off on the tasks using the work manager 42 (FIG. 8) at 234. Once notified that the maintenance work has been completed, at 236, the inspector records his start time, completes his inspection, and then records his completion time at 238 using the work manager 42 (FIG. 8). At 240, once the technician and the inspector has signed off on the corrective action, the technician or the inspector can now officially release the aircraft 24 (FIG. 1) for the next scheduled flight.

The line technician then turns in the unserviceable part at 242 by returning the part to the stores clerk at the storesroom. The unserviceable information can also be written to the part tag for future reference using the part manager 44 (FIG. 7). The unserviceable part can be held by the stores clerk in a separate unserviceable staging area of the stores room at 244. A repair router can rout the part for repair at 246 using the part manager 44 (FIG. 7). For example, a repair router can generate a work order for the part repair using the part manager 44 (FIG. 7), and can records the status for the part. The repair router can then associate the fault or the previous work order 100 (FIG. 7) to the new work order to track the correlated events. Finally, the repair router schedules the parts work order, and sets the location to send the part.

With reference to FIGS. 11*a*, 11*b*, 12*a* and 12*b*, an exemplary business method of managing aircraft maintenance using the aircraft maintenance management system 10 (FIG. 1) is shown. Both examples illustrate the operation of the business method when the current flight schedule 92 (FIG. 4) does not permit scheduling of the repair at the next destination.

For example, the PIREP 56 (FIG. 2) is generated at 300, the fault details are reviewed at 310 and the solution 74 (FIG. 3) is determined at 312 as discussed above. The available resources 94 (FIG. 4) and the flight schedule 92 (FIG. 4) are evaluated at 314 as discussed above. However, at 316, there is not sufficient time to perform the repair at the next destination.

At 318, an airline dispatcher reviews the flight schedule 92 (FIG. 5) and other information such as the payload and weather for the next leg of the flight using the flight schedule evaluator 38 (FIG. 5). If his analysis indicates that continuing the flight would surpass performance parameters, the airline dispatcher can advise the maintenance controller to fix the fault and selects a workable tail swap by evaluating comparable equipment, passenger booking and convenience, crew scheduling, and impacts to the maintenance schedule (for example, if the other aircraft has maintenance scheduled). The airline dispatcher executes the swap and updates the flight schedule 118 (FIG. 5) using the flight schedule evaluator 38 (FIG. 5). All operations respond to the news of the swap. For example, the swap may cause conflicts with other maintenance work already scheduled for the aircraft 24 (FIG. 2). A flight coordinator re-plans the maintenance conflicts using, for example, the work order generator 36 (FIG. 4).

At 326, if the parts are available, the work order 100 (FIG. 4) is generated at 328 and the parts are reserved at 340 as discussed above. The maintenance is scheduled at 342, the parts are retrieved at 344 and 346, and the maintenance is performed at 348-360 as discussed above. The faulty parts are returned at 362 and 364 and the parts are routed for repair at 366 as discussed above.

Figure 12A:
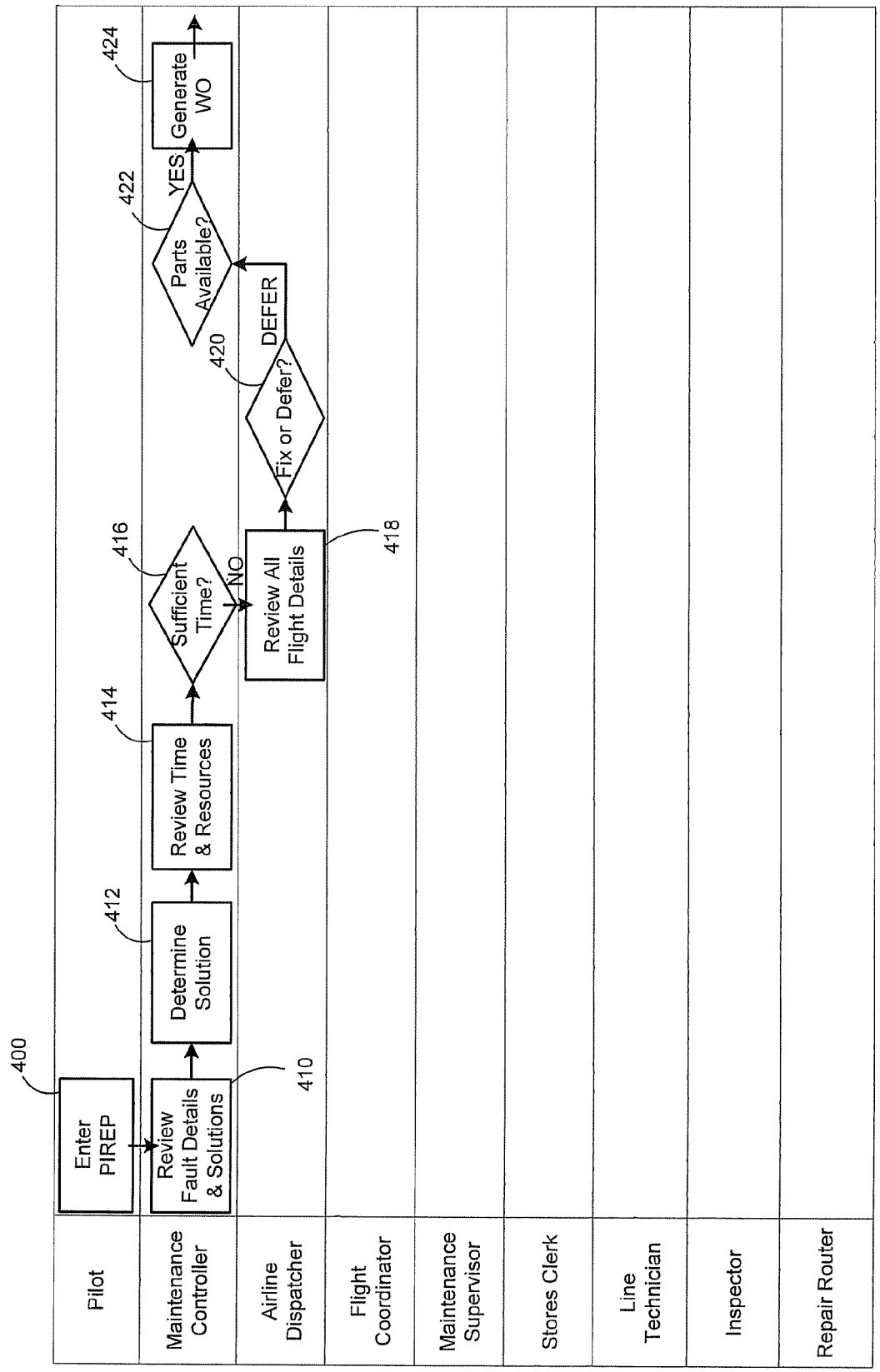
FIGS. 12a and 12b are process flow diagrams illustrating exemplary steps of performing aircraft maintenance management according to a third embodiment and based on the aircraft maintenance management system of FIG. 1, according to various aspects of the present disclosure.
Figure 12B:
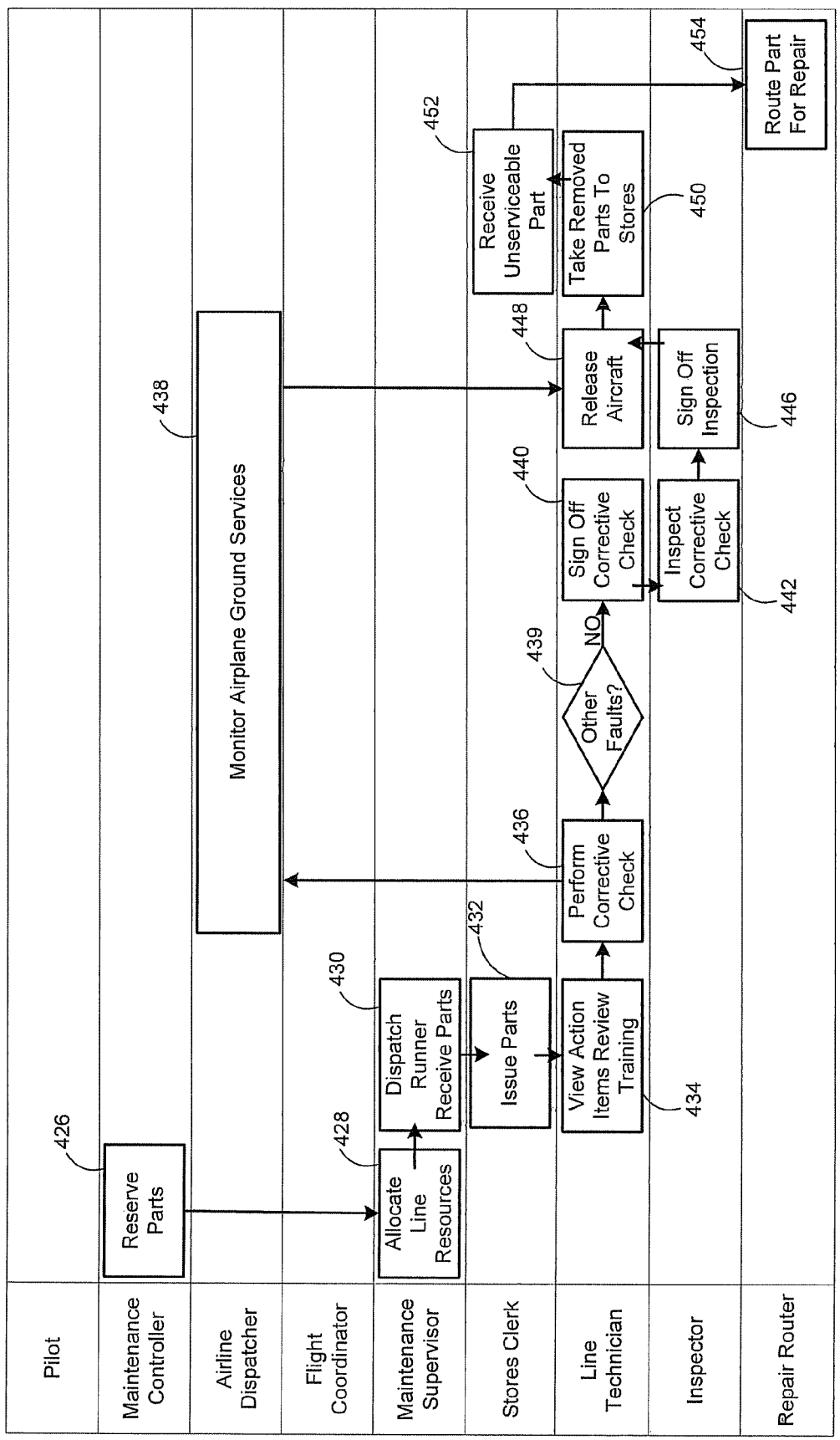

As shown in FIGS. 12*a* and 12*b*, in this case, the current flight schedule 92 (FIG. 4) does not permit scheduling of the repair at the next destination, the airline dispatcher decides to defer the fix until the aircraft 24 (FIG. 1) lands at an alternate destination. For example, the PIREP 56 (FIG. 2) is generated at 400, the fault details are reviewed at 410 and the solution 74 (FIG. 3) is determined at 412 as discussed above. The available resources 94 (FIG. 4) and the flight schedule 92 (FIG. 4) are evaluated at 414 as discussed above. However, at 416, there is not sufficient time to perform the repair at the next destination. After reviewing the flight details at 418 as discussed above, it is determined at 420 to defer the maintenance.

If the parts are available at 422 the work order 100 (FIG. 4) is generated and the maintenance is scheduled for the later time at 424 and the parts are reserved at 426 as discussed above. The maintenance is scheduled at 428, the parts are retrieved at 430 and 432, and the maintenance is performed at 434-448 as discussed above. The faulty parts are returned at 450 and 452 and the parts are routed for repair at 454 as discussed above.

Figure 13A:
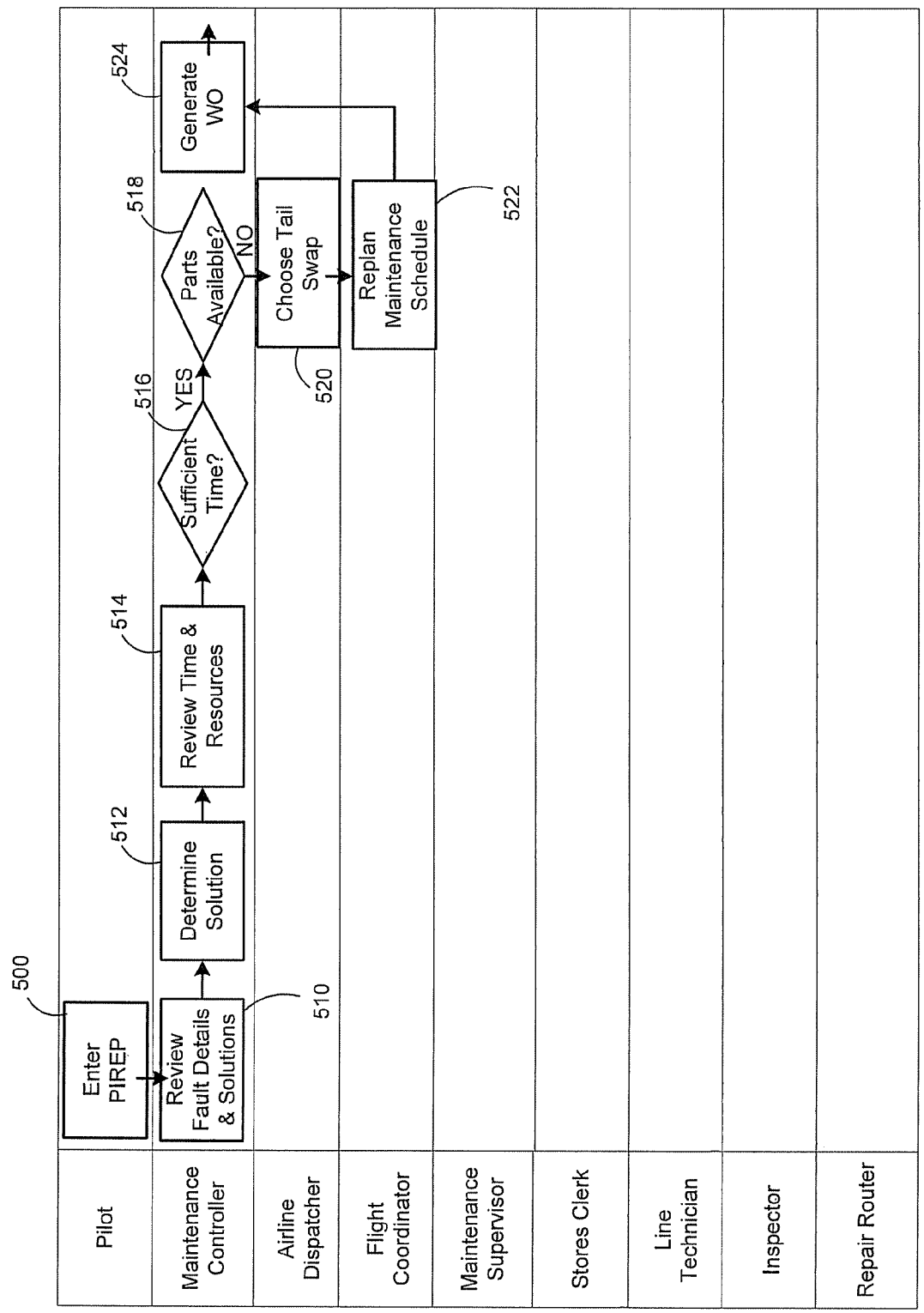
FIGS. 13a and 13b are process flow diagrams illustrating exemplary steps of performing aircraft maintenance management according to a fourth embodiment and based on the aircraft maintenance management system of FIG. 1, according to various aspects of the present disclosure.
Figure 13B:
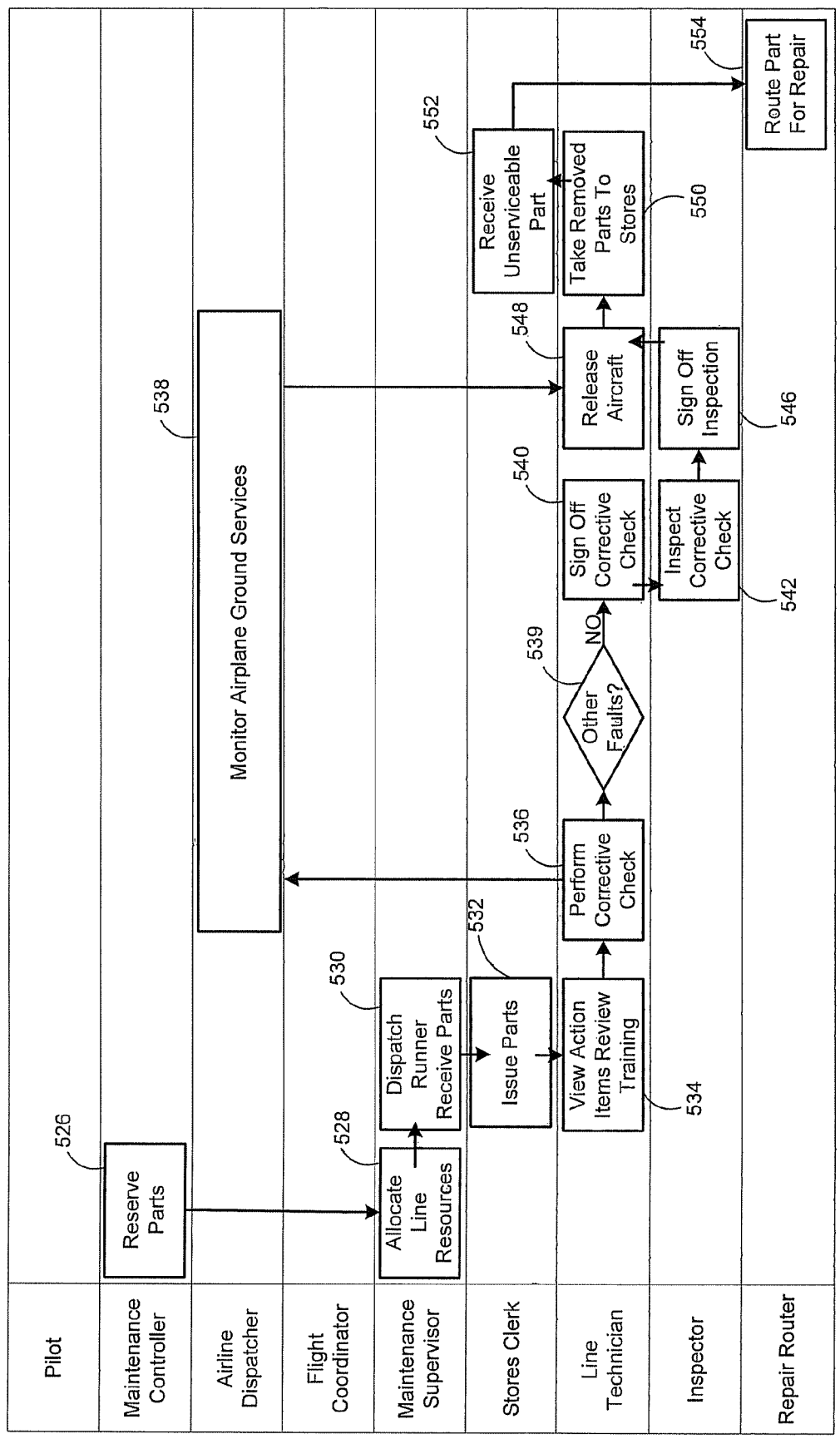
Figure 14A:
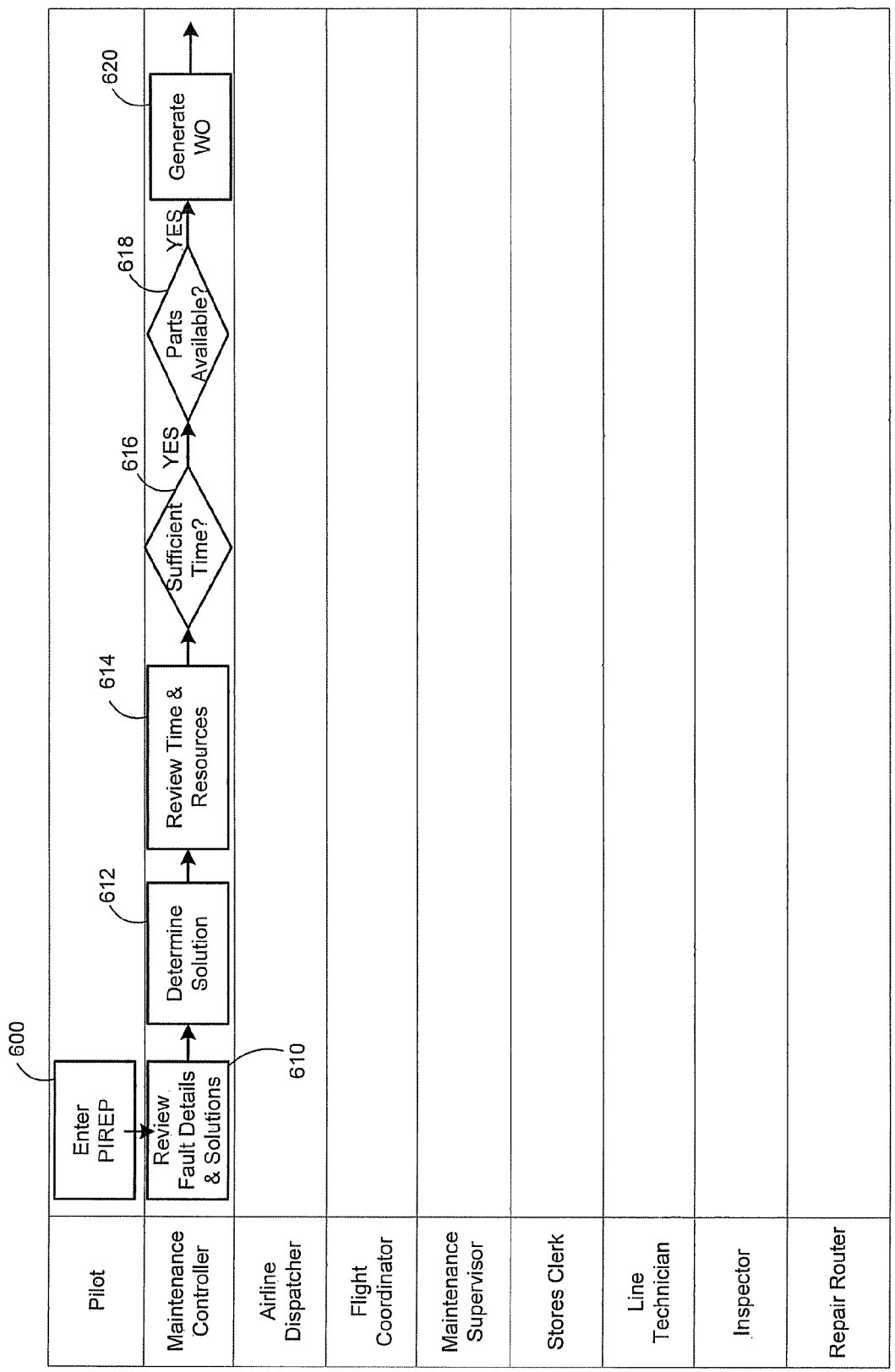
FIGS. 14a and 14b are process flow diagrams illustrating exemplary steps of performing aircraft maintenance management according to a fifth embodiment and based on the aircraft maintenance management system of FIG. 1, according to various aspects of the present disclosure.
Figure 14B:
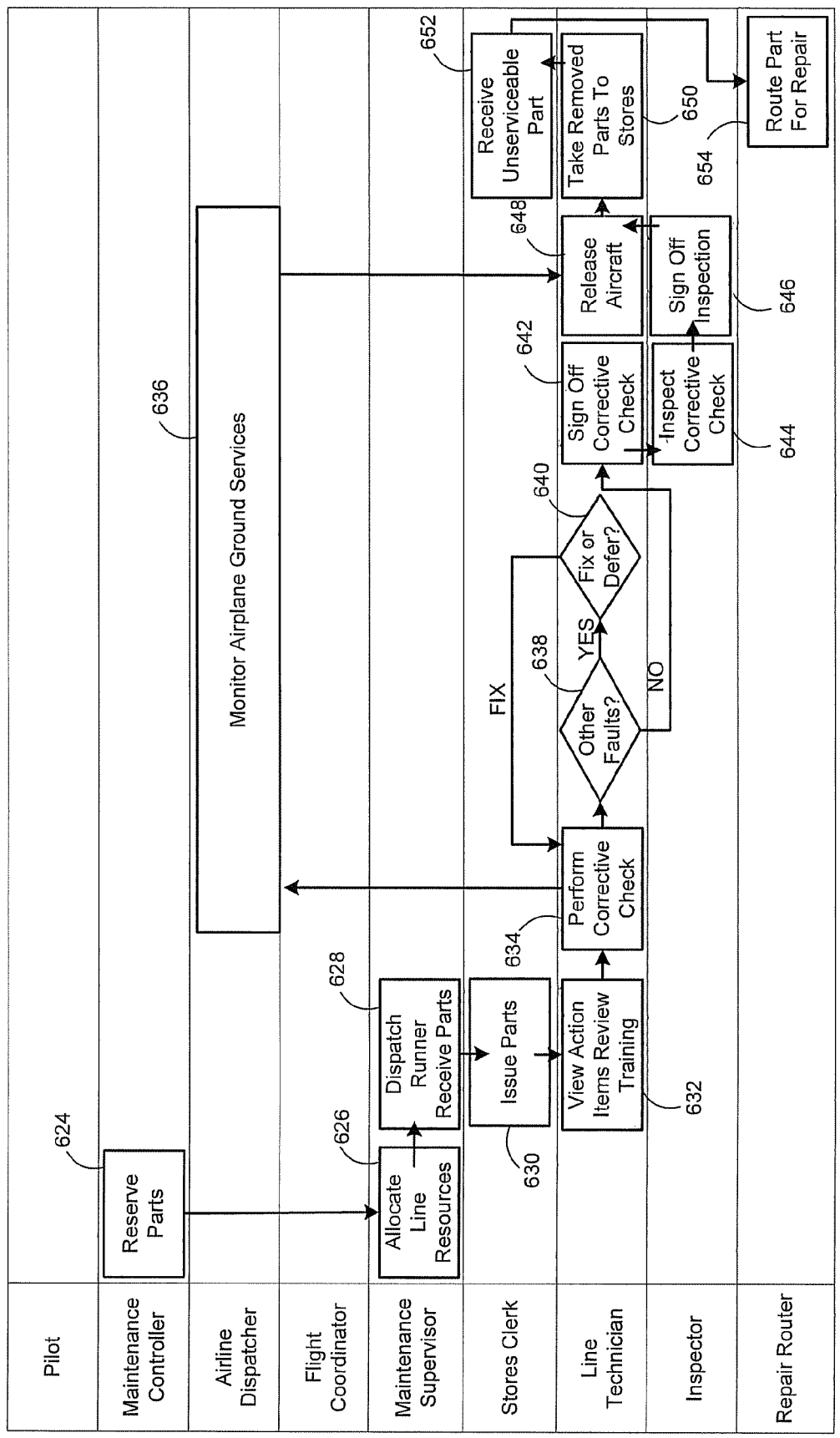

With reference to FIGS. 13*a* and 13*b*, an exemplary business method of managing aircraft maintenance using the aircraft maintenance management system 10 (FIG. 1) is shown. This example illustrates the operation of the business method when the current flight schedule indicates that there is sufficient time to perform the repair, however, the parts are not available at the next destination.

For example, the PIREP 56 (FIG. 2) is generated at 500, the fault details are reviewed at 510 and the solution 74 (FIG. 3) is determined at 512 as discussed above. The available resources 94 (FIG. 4) and the flight schedule 92 (FIG. 4) are evaluated at 514 as discussed above. After reviewing the flight details at 514 as discussed above, it is determined at 516 that there is sufficient time at the next destination to perform the maintenance. However, it is determined that parts are not available at 518.

The airline dispatcher reviews the flight schedule 92 (FIG. 5) and other information such as the payload and weather for the next leg of the flight using the flight schedule evaluator 38

(FIG. 5). If his analysis indicates that continuing the flight would surpass performance parameters, the airline dispatcher can advise the maintenance controller to fix the fault and selects a workable tail swap by evaluating comparable equipment, passenger booking and convenience, crew scheduling, and impacts to the maintenance schedule (for example, if the other aircraft has maintenance scheduled). The airline dispatcher executes the swap and updates the flight schedule 118 (FIG. 5) at 520 using the flight schedule evaluator 38 (FIG. 5). All operations respond to the news of the swap. For example, the swap may cause conflicts with other maintenance work already scheduled for the aircraft 24 (FIG. 1). A flight coordinator re-plans the maintenance conflicts at 522 using, for example, the work order generator 36 (FIG. 4).

The work order 100 (FIG. 4) is generated and the maintenance is scheduled for the later time at 524 and the parts are reserved at 526 as discussed above. The maintenance is scheduled at 528, the parts are retrieved at 530 and 532, and the maintenance is performed at 534-548 as discussed above. The faulty parts are returned at 550 and 552 and the parts are routed for repair at 554 as discussed above.

With reference to FIGS. 14*a*, 14*b*, 15*a*, and 15*b*, an exemplary business method of managing aircraft maintenance using the aircraft maintenance management system 10 (FIG. 1) is shown. Both examples illustrate the operation of the business method when technician, during or after performing the repair finds another fault within the aircraft.

For example, the PIREP 56 (FIG. 2) is generated at 600, the fault details are reviewed at 610 and the solution 74 (FIG. 3) is determined at 612 as discussed above. The available resources 94 (FIG. 4) and the flight schedule 92 (FIG. 4) are evaluated at 614 as discussed above. After reviewing the flight details at 614 as discussed above, it is determined at 616 that there is sufficient time at the next destination to perform the maintenance and at 618 that there are sufficient parts available.

At 620, the work order 100 (FIG. 4) is generated and the parts are reserved at 624 as discussed above. The maintenance is scheduled at 626, the parts are retrieved at 628 and 620, and the maintenance is performed at 632 and 634 as discussed above. However, during or after performing the maintenance, the technician finds another fault within the aircraft at 638. In this case, the technician decides there is enough time to fix the fault at 640. The technician performs the maintenance on the new fault similarly as performed on the first fault as discussed above.

Once the maintenance is complete and there are no existing faults at 638, the technician records her stop times and signs off on the tasks using the work manager 42 (FIG. 8) at 642. The inspector completes the inspection at 644 and 648 and the aircraft 24 (FIG. 1) is released for the next scheduled flight at 648 as discussed above. The faulty parts are returned at 650 and 652 and the parts are routed for repair at 654 as discussed above.

Figure 15A:
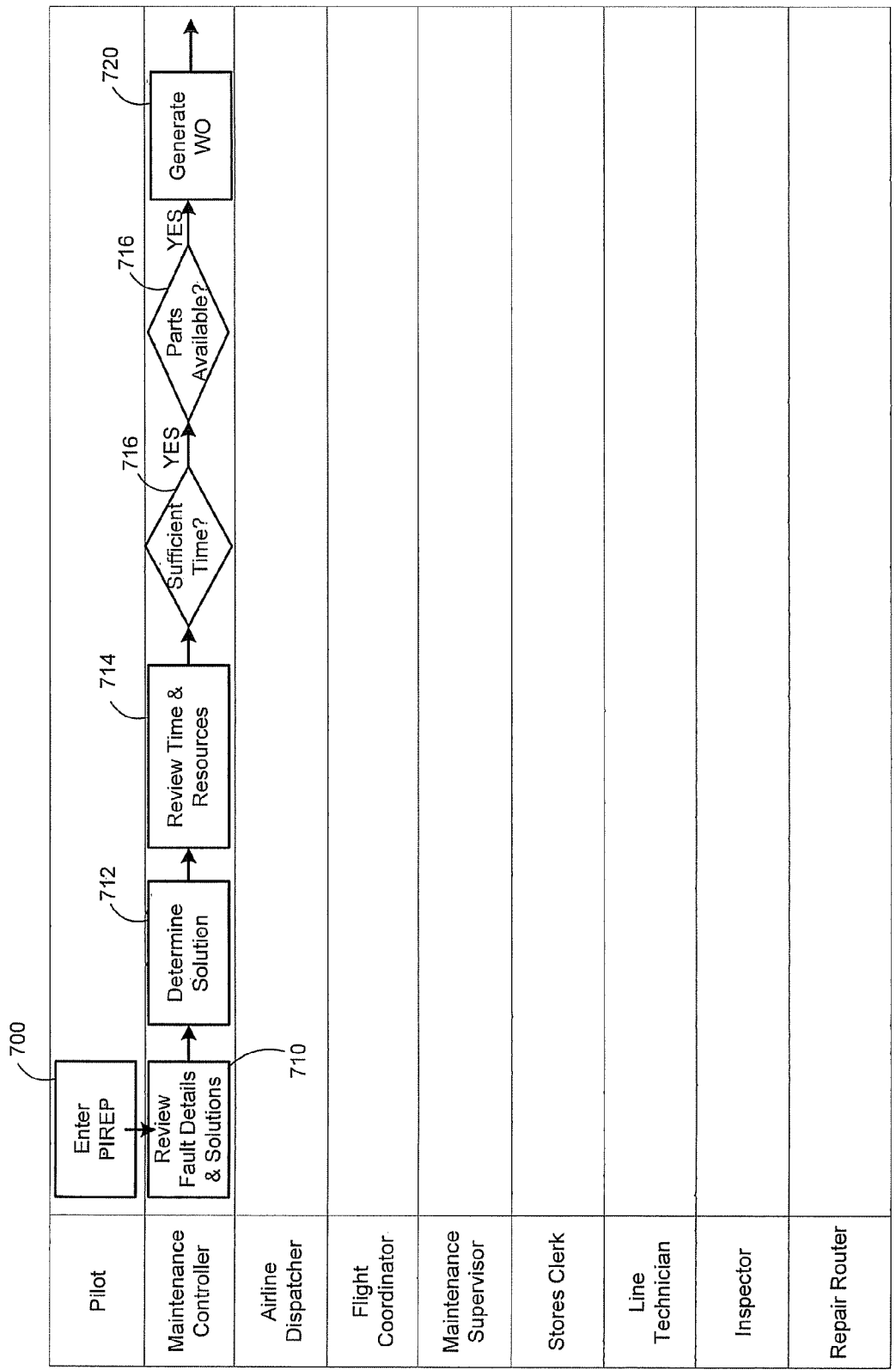
FIGS. 15a and 15b are process flow diagrams illustrating exemplary steps of performing aircraft maintenance management according to a sixth embodiment and based on the aircraft maintenance management system of FIG. 1, according to various aspects of the present disclosure.
Figure 15B:
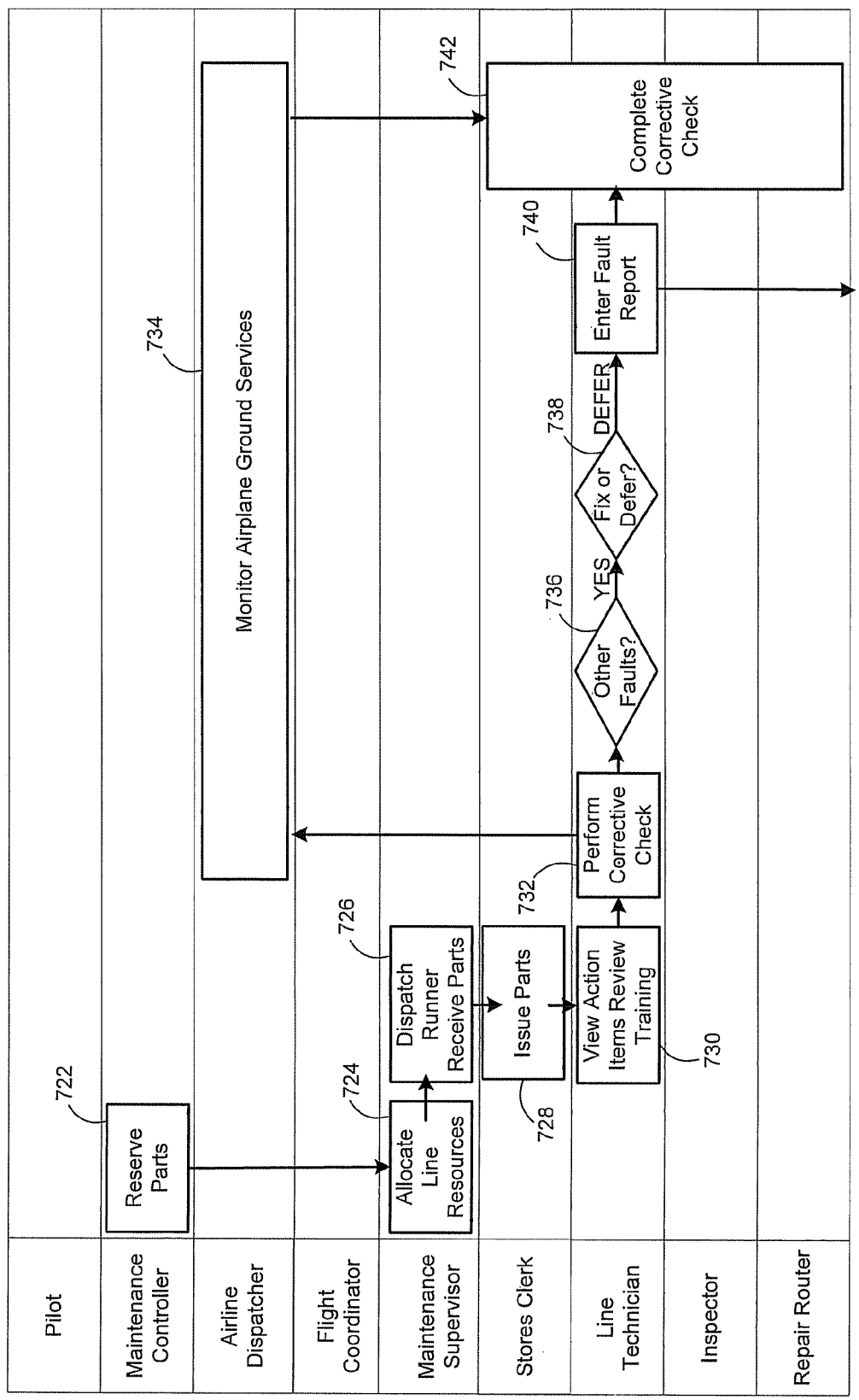

As shown in FIGS. 15*a* and 15*b*, in this case, the technician discovers a second fault within the aircraft 24 (FIG. 1), however, the technician decides to defer the fix until parts can be retrieved or for when sufficient time exists. For example, the PIREP 56 (FIG. 2) is generated at 700, the fault details are reviewed at 710 and the solution 74 (FIG. 3) is determined at 712 as discussed above. The available resources 94 (FIG. 4) and the flight schedule 92 (FIG. 4) are evaluated at 714 as discussed above. After reviewing the flight details at 714 as discussed above, it is determined at 716 that there is sufficient time at the next destination to perform the maintenance and, at 718, that there are sufficient parts available.

At 720, the work order 100 (FIG. 4) is generated and the parts are reserved at 724 as discussed above. The maintenance is scheduled at 726, the parts are retrieved at 728 and 720, and the maintenance is performed at 732 and 734 as discussed above. However, during or after performing the maintenance, the technician finds another fault within the aircraft at 738. In this case, the technician decide to defer the fix at 738. The technician enters the fault information 55 (FIG. 2) using the fault report generator 30 (FIG. 2) at 740. The technician fault information 55 (FIG. 2) is then fed back the maintenance controller for generating the new work order 100 (FIG. 4) at 710-720. Meanwhile, the steps for completing the maintenance, inspecting the maintenance, and processing the defective part is performed at 742, similarly as discussed above.

Figure 16A:
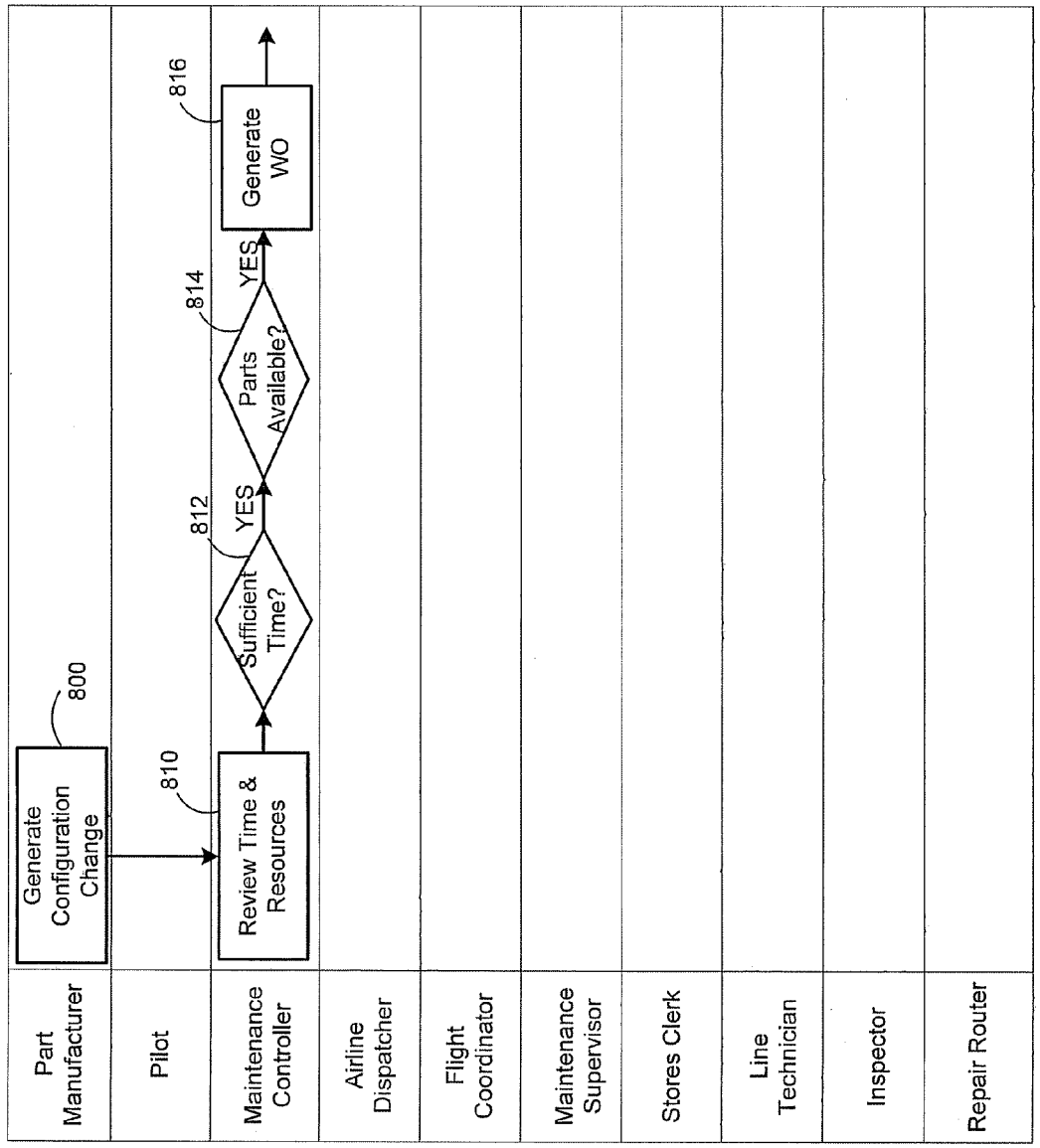
FIGS. 16a and 16b are process flow diagrams illustrating exemplary steps of performing aircraft maintenance management according to a seventh embodiment and based on the aircraft maintenance management system of FIG. 1, according to various aspects of the present disclosure.
Figure 16B:
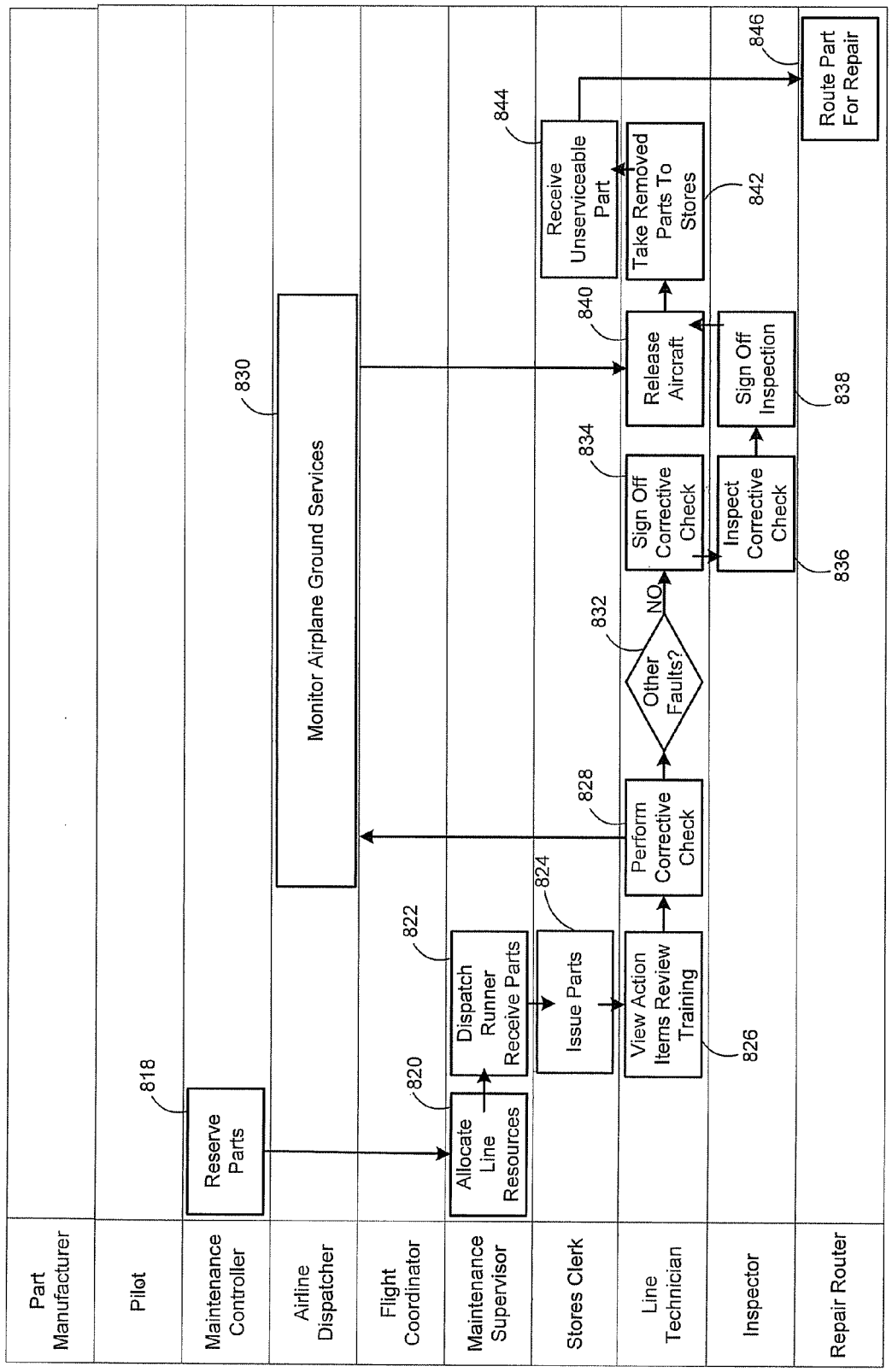

With reference to FIGS. 16*a* and 16*b*, an exemplary business method of managing aircraft maintenance using the aircraft maintenance management system 10 (FIG. 1) is shown. This example illustrates the operation of the business method when the authorized configuration change request 99 (FIG. 4) is generated from either a regulatory authority or a parts manufacturer. In this example, the authorized configuration change request 99 (FIG. 4) is generated by a part manufacturer.

For example, at 800, the part manufacturer generates the authorized configuration change request 99 (FIG. 4) by, for example, issuing an electronic service bulletin. The maintenance controller receives the authorized configuration change request 99 (FIG. 4) and reviews the available resources 94 (FIG. 4) and the flight schedule 92 (FIG. 4) at 810 as discussed above. If there is sufficient time to complete the change request at 812 and parts are available at 814, the work order 100 (FIG. 4) is generated and the maintenance at 816 and the parts are reserved at 818 as discussed above. The maintenance is scheduled at 820, the parts are retrieved at 822 and 824, and the maintenance is performed at 826-840 as discussed above. The faulty parts are returned at 842 and 844 and the parts are routed for repair at 846 as discussed above.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method, using at least one computer, of managing maintenance of an aircraft, the aircraft being associated with a gate at an airport, method comprising:

generating an electronic report that indicates a fault of the aircraft;

electronically integrating the electronic report with resource data and flight schedule data of the aircraft to establish a repair solution for the fault; and generating an electronic work order based on the repair solution;

electronically maintaining the flight schedule of the aircraft based on the electronic work order; and further comprising monitoring conditions of the aircraft and updated gate information of the gate associated with the aircraft;

using a network to access a flight schedule evaluator subsystem that:

generates information, based on the monitoring of the conditions, indicating whether the electronic work order can be completed within a current flight schedule for the aircraft; and adjusts the flight schedule of the aircraft if the electronic work order cannot be completed without interfering with the flight schedule of the aircraft;

further comprising integrating at least one of electronic manuals and electronic training information for use in at least one of establishing the repair solution and performing work associated with the electronic work order; and further comprising electronically generating a parts order based on aircraft configuration information and available resources.

2. The method of claim 1 further comprising electronically managing an assignment of the electronic work order to a technician.

3. The method of claim 1 further comprising electronically managing work associated with the electronic work order as the work is being performed.

4. The method of claim 3 further comprising electronically scheduling the work based on available resources and the repair solution.

5. The method of claim 3 further comprising electronically managing an inspection of the work.

6. The method of claim 1 further comprising electronically integrating part information with the report.

7. A maintenance management system for an aircraft, where the aircraft is intended to board and depart from a gate at an airport, the system comprising:

one or more computers on which computer readable mediums are able to run, the computer readable mediums being in communication via a network, and at least one of the computers including a portable service tool used by a technician, the computer readable mediums operating to form:

a fault evaluator operable to evaluate fault data of an aircraft and establish a repair solution;

a work order generator operable to generate an electronic work order based on the repair solution;

a maintenance manager operable to assign the work order to the technician;

a work manager running on the portable service tool and operable to manage work associated with the work order as it is being performed by the technician;

a flight schedule evaluator for receiving information from the portable service tool and evaluating whether the work order can be performed within a current flight schedule of the aircraft, and when it is determined that the work order will not be able to be completed within the current flight schedule, the flight schedule evaluator performs one of adjusting the flight schedule as needed, and providing a substitute aircraft for the aircraft;

a gate situational awareness reporter configured to run on a processor that provides updated gate information concerning the gate associated with operation of the aircraft, the updated gate information indicating available time to complete the work order to the technician; and wherein the system is further configured to:

integrate at least one of electronic manuals and electronic training information for use in at least one of establishing the repair solution and performing work associated with the electronic work order; and electronically generate a parts order based on aircraft configuration information and available resources.

8. The system of claim 7 wherein the fault evaluator is further operable to establish the repair solution based on repair history.

9. The system of claim 7 wherein the fault evaluator is further operable to access electronic manuals for use in establishing the repair solution.

10. The system of claim 7 wherein the work order generator is further operable to schedule the work based on available resources and the repair solution.

11. The system of claim 7 wherein the maintenance manager is further operable to generate a parts retrieval request based on the repair solution.

12. The system of claim 7 further comprising a fault report generator operable to generate the fault data of the aircraft based on at least one of fault data generated by the aircraft and fault information entered by a user.

13. The system of claim 7 wherein the work manager is further operable to manage the work based on the updated information.

14. The system of claim 7 wherein the conditions of the aircraft include at least one of boarding information and ground services information.

15. The system of claim 7 further comprising a part manager operable to manage at least one of a retrieval and a release of parts for the aircraft.

16. The system of claim 15 wherein the part manager is further operable to manage the at least one of the retrieval and the release of the parts based on part tag data.

17. The system of claim 7 wherein the work manager is further operable to manage an inspection of the work after it has been performed by the technician.

18. The system of claim 7 wherein the work manager is further operable to provide at least one of training information and a manual to the technician.

19. An maintenance management system for an aircraft comprising:

one or more computers on which computer readable mediums are operable to run, the computer readable mediums being in communication over a network, and at least one of the computers including a portable service tool used by a technician, the computer readable mediums operating to form:

a fault report generator operable to generate fault data of an aircraft based on at least one of fault data generated by the aircraft and fault information entered by a user;

a fault evaluator operable to evaluate the fault data of the aircraft and establish a repair solution;

a work order generator operable to generate a work order and a parts order based on the repair solution;

a flight schedule evaluator operable to evaluate whether the work order can be performed within a current flight schedule of the aircraft, and when it is determined that the work order will not be able to be completed within the current flight schedule, the flight schedule evaluator performs one of adjusting the flight schedule as needed, and providing a substitute aircraft for the aircraft;

a maintenance manager operable to assign the work order to a technician;

a part manager operable to manage at least one of a retrieval and a release of parts for the aircraft based on the parts order;

a gate situational awareness reporter operable to monitor conditions of the aircraft and generate updated gate information based on the conditions, and to supply the updated gate information to the technician to indicate to the technician available time to perform the work order; and a work manager running on the portable service tool operable to manage maintenance work as it is being performed by the technician;
wherein the system is further configured to:
integrate at least one of electronic manuals and electronic training information for use in at least one of establishing the repair solution and performing work associated with the electronic work order; and
electronically generate the parts order based on aircraft configuration information and available resources.

* * * * *